US011785495B2

(12) United States Patent
Zhang et al.

(10) Patent No.: US 11,785,495 B2
(45) Date of Patent: Oct. 10, 2023

(54) SIDELINK QUALITY OF SERVICE FLOW MANAGEMENT IN WIRELESS COMMUNICATIONS SYSTEMS AND RELATED METHODS AND APPARATUSES

(71) Applicant: Telefonaktiebolaget LM Ericsson (publ), Stockholm (SE)

(72) Inventors: Congchi Zhang, Shanghai (CN); Marco Belleschi, Solna (SE); Liang Hu, San Diego, CA (US); Zhang Zhang, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 254 days.

(21) Appl. No.: 17/293,322

(22) PCT Filed: Oct. 30, 2019

(86) PCT No.: PCT/EP2019/079582
§ 371 (c)(1),
(2) Date: May 12, 2021

(87) PCT Pub. No.: WO2020/099128
PCT Pub. Date: May 22, 2020

(65) Prior Publication Data
US 2021/0409996 A1    Dec. 30, 2021

(51) Int. Cl.
*H04W 28/02* (2009.01)
*H04W 76/30* (2018.01)
(Continued)

(52) U.S. Cl.
CPC ... *H04W 28/0263* (2013.01); *H04W 28/0268* (2013.01); *H04W 28/12* (2013.01); *H04W 76/30* (2018.02); *H04W 92/18* (2013.01)

(58) Field of Classification Search
CPC ............. H04W 28/0263; H04W 76/30; H04W 28/0268; H04W 28/12; H04W 92/18
See application file for complete search history.

(56) References Cited

U.S. PATENT DOCUMENTS

| 2019/0261211 A1* | 8/2019 | Wu ........................ H04W 76/20 |
| 2019/0281587 A1* | 9/2019 | Zhang ................... H04W 72/23 |

(Continued)

FOREIGN PATENT DOCUMENTS

| WO | WO 2020/030793 A1 | 2/2020 |
| WO | WO 2020/064325 A1 | 4/2020 |

OTHER PUBLICATIONS

International Search Report and Written Opinion of the International Searching Authority, PCT/EP2019/079582, dated Mar. 9, 2020, 13 pages.

(Continued)

*Primary Examiner* — Ajay Cattungal
(74) *Attorney, Agent, or Firm* — Christopher & Weisberg, P.A.

(57) ABSTRACT

Methods of operating user equipment for device-to-device, D2D, communications are provided. Operations include transmitting a quality of service, QoS, flow establishment request, the flow establishment request indicating that the QoS flow is to be transmitted over a sidelink, responsive to a determination that a required QoS flow will be fulfilled, receiving a message indicating that a requested sidelink QoS flow will be supported and receiving mapping and configuration data corresponding to the sidelink QoS flow, and responsive to determining that the required QoS may not be fulfilled, receiving a message indicating that the requested sidelink QoS flow will not be established.

18 Claims, 18 Drawing Sheets

(51) Int. Cl.
*H04W 28/12* (2009.01)
*H04W 92/18* (2009.01)

(56) References Cited

U.S. PATENT DOCUMENTS

2019/0357106 A1* 11/2019 Ke .................... H04W 36/0033
2021/0329487 A1* 10/2021 Wang .................. H04W 28/24

OTHER PUBLICATIONS

Huawei, et al., "Radio Bearer Configuration And Management For NR Sidelink," 3GPP TSG-RAN WG2 Meeting #104, Spokane, WA, USA, Nov. 12-16, 2018, Agenda Item 11.4.5, R2-1816522 (XP051480475) 5 pages.

3rd Generation Partnership Project; Technical Specification Group Services and System Aspects; Study on enhancement of 3GPP Support for 5G V2X Services (Release 16), 3GPP TR 22.886 V16.1.1 (Sep. 2018), 74 pages.

3rd Generation Partnership Project; Technical Specification Group Radio Access Network; NR; NR and NG-RAN Overall Description; Stage 2 (Release 15), 3GPP TS 38.300 V15.3.1 (Oct. 2018), 92 pages.

3rd Generation Partnership Project; Technical Specification Group Services and System Aspects; System Architecture for the 5G System; Stage 2 (Release 15), 3GPP TS 23.501 V15.3.0 (Sep. 2018), 226 pages.

* cited by examiner

SIDELINK QUALITY OF SERVICE FLOW MANAGEMENT IN WIRELESS COMMUNICATIONS SYSTEMS AND RELATED METHODS AND APPARATUSES

CROSS REFERENCE TO RELATED APPLICATIONS

This application is a 35 U.S.C. § 371 national stage application of PCT International Application No. PCT/EP2019/079582 filed on Oct. 30, 2019, which in turns claims priority to International Patent Application No. PCT/CN2018/115128, filed on Nov. 13, 2018, the disclosures and content of which are incorporated by reference herein in their entirety.

TECHNICAL FIELD

The present disclosure relates generally to communications, and more particularly, to wireless communications and related wireless devices and network nodes.

BACKGROUND

LTE vehicle-to-anything (V2X) was first specified in 3GPP Release 14 of 3GPP LTE and is currently under investigation for 3GPP Release 15. LTE V2X includes new features and enhancements that allow for vehicular communications. One of the most relevant aspects is the introduction of direct vehicle-to-vehicle (V2V) communication functionalities. The specifications support other type of V2X communications, including V2P (vehicle-to-pedestrian or pedestrian-to-vehicle), V2I (vehicle-to-infrastructure), etc., as shown in FIG. 1.

These direct communication functionalities are built upon LTE D2D (device to device), also known as ProSe (Proximity Services), as first specified in the Release 12 of LTE, and include many important enhancements targeting the specific characteristics of vehicular communications. For example, LTE V2X operation is possible with and without network coverage and with varying degrees of interaction between the UEs (user equipment) and the network (NW), including support for standalone, network-less operation. To enhance the system level performance under high device density while meeting the latency requirements of V2X, new transmission modes (also referred to as resource allocation modes) were introduced: Mode 3 and Mode 4. In Mode 3, the NW is in charge of performing resource allocation whereas in Mode 4, the UE autonomously selects the resources for its own transmissions.

To support 5G V2X services, 28 use cases and their performance requirements are studied in TR 22.886 [1]. It is shown that 5G V2X services usually come with stringent Quality of Service (QoS) requirements, e.g. 99.999% reliability and 10 ms latency. Benefiting from the ultra-reliable and lower latency wireless connection, vehicles can optimize their maneuvers via, e.g., cooperative driving or forming a platoon. From another perspective, any disturbance/interruption on the wireless connection may lead to hazardous situations or even car accident.

Currently, there are many Use Cases (UCs) under discussion within V2X context, e.g. platooning, cooperative driving, car following and hazard zone warning etc. [1]. Many of them have stringent requirements on QoS, e.g. 99.9% reliability and 50 ms maximum latency. Table 1 provides some example UCs and their requirements discussed within 3GPP.

| Use Case | Maximum latency | Reliability |
|---|---|---|
| eV2X support for Vehicle Platooning | 25 ms | 90% |
| Information exchange within platoon | 500 ms | N/A |
| cooperative collision avoidance (CoCA) | 10 ms | 99.99% |
| Cooperative lane change (CLC) of automated vehicles | 25 ms | 90% |

In NR Uu interface, QoS control may be handled on QoS flow level in 5GS. The basic idea behind is that each QoS flow is associated with a 5QI value, which indicates the associated QoS requirements. Such requirements may include reliability, latency, and/or data rate, among others. QoS requirements may depend on the service and user's subscription with the operator.

Once a UE is connected to the core network, CN, a session may be established between the UE and the CN with a default QoS flow and a default data radio bearer (DRB). Reference [2] specifies a number of ways to establish/release a new QoS flow. Brief reference is made to FIG. 2, which is a schematic data flow diagram illustrating an example of QoS flow establishment in NR Uu. As provided, a new QoS flow can be initiated by CN, the request is sent to gNB. It may be up to gNB to decide whether to accept or reject the QoS flow according to admission control rules. If accepted, gNB may map the QoS flow to a new DRB or an existing DRB. UE will be configured accordingly. Another example provides that a new QoS flow can be initiated by UE, which first sends the data via default bearer with a new QFI in its SDAP header. It's up to gNB whether to establish a new DRB for this new QoS flow. In another example, when CN wants to release an established QoS flow, it may send a request to gNB, and then may send an RRC DRB modify request to the UE to release the QFI to DRB mapping.

The ARP of a QoS flow is used for the sake of flow-based admission control procedures in which gNB decides whether or not the requested flow should be established in case of radio congestion. It also governs the prioritization of the QoS flow in terms of pre-emption with respect to a new QoS flow establishment request [3]. Further, in NR, it may be allowed to have multiple QoS flows mapped to the same bearer. In other word, it may be up to gNB to map the QoS flow to an existing DRB or a new DRB.

The QoS framework for NR sidelink, SL, is under discussion in 3GPP. Since the QoS framework in LTE SL, which is based on PPPP/PPPR per packet, is not robust enough to support stringent eV2X QoS requirements, it is expected that NR SL should use similar QoS framework as in Uu, which is QoS flow and DRB based.

NR SL bearer establishment and admission control considering the available resources and the interference environment have been considered. For instance, according to reference [4] In NW controlled mode, before the transmitter establishes a bearer and activates the service, it shall request bearer permission/configuration from gNB. gNB estimates the amount of available resources and accepts the request when there are enough resources to support the required QoS, e.g. data rate.

According to reference [5], in autonomous mode, the admission control can be done based on the (pre)configured rules from NW, e.g. via SIB/RRC. For instance, one UE can only establish a bearer for a certain service when the channel busy ratio (CBR) is lower than a threshold value.

According to reference [6], methods to leverage information from RX side when TX UE attempts to establish a DRB are described. In reference [7], methods to monitor, maintain and release an established SL DRB according to the QoS performance are described.

Until now, some solutions include SL QoS management at DRB level, which could work when it's one to one mapping between SL QoS flow and SL DRB. Establishing or releasing one SL DRB may mean establishing or releasing a corresponding SL QoS flow. However, it becomes problematic when multiple SL QoS flows are mapped to the same SL DRB. For example, assuming one UE has three SL QoS flows mapped to one SL DRB, and gNB must pre-empt some resources due to channel congestion, it would release the SL QoS flow with the lowest priority rather than release the whole SL DRB. This may mean the release all three associated QoS flows. In other word, QoS management in NR SL must target not only SL bearer but also SL QoS flow. The SL QoS flow management mechanisms are currently missing. Of course, NR SL QoS flow management can reuse what is in NR Uu. However, heavy interaction, which also means overhead, with CN as in NR Uu seems unnecessary for NR SL, since SL data does not go via CN. Thus, CN involvement in SL QoS flow management can be minimized.

SUMMARY

According to some embodiments of inventive concepts, methods of operating a user equipment, UE, for device-to-device, D2D, communications are provided. Methods may include transmitting a quality of service, QoS, flow establishment request. The flow establishment request may indicate that the QoS flow is to be transmitted over a sidelink, SL. In response to a determination that a required QoS flow will be fulfilled, operations include receiving a message indicating that a requested sidelink QoS flow will be supported and receiving mapping and configuration data corresponding to the sidelink QoS flow. In response to determining that the required QoS may not be fulfilled, operations may include receiving a message indicating that the requested sidelink QoS flow will not be established.

According to some embodiments of inventive concepts, a user equipment, UE is provided. The UE may include a transceiver, a processor coupled to the transceiver, and a memory coupled to the processor, wherein the memory stores instructions that when executed by the processor cause the UE to transmit a quality of service, QoS, flow establishment request, the flow establishment request indicating that the QoS flow is to be transmitted over a sidelink. In response to a determination that a required QoS flow will be fulfilled, a message may be received that indicates that a requested sidelink QoS flow will be supported and receiving mapping and configuration data corresponding to the sidelink QoS flow. In response to determining that the required QoS may not be fulfilled, a message may be received that indicates that the requested sidelink QoS flow will not be established.

According to some embodiments of inventive concepts, methods of operating a network node for providing network assisted sidelink quality of service flow management are provided. Such methods include receiving, from a user equipment, UE, a quality of service, QoS, flow establishment request, the flow establishment request indicating that the QoS flow is to be transmitted over a sidelink, determining whether a required QoS flow will be fulfilled, in response to determining that the required QoS flow will be fulfilled, transmitting a message indicating that a requested sidelink QoS will be supported and transmitting mapping and configuration data corresponding to the sidelink QoS flow, and in response to determining that the required QoS flow may not be fulfilled, transmitting a message indicating that the requested sidelink QoS will not be established.

According to some embodiments of inventive concepts, a network node is provided. The network node may include a transceiver, a processor coupled to the transceiver and a memory coupled with the processor. The memory stores instructions that when executed by the processor causes the network node to receive, from a user equipment, UE, a quality of service, QoS, flow establishment request, the flow establishment request indicating that the QoS flow is to be transmitted over a sidelink, to determine whether a required QoS flow will be fulfilled, to, in response to determining that the required QoS flow will be fulfilled, transmit a message indicating that a requested sidelink QoS will be supported and transmitting mapping and configuration data corresponding to the sidelink QoS flow and to, in response to determining that the required QoS flow may not be fulfilled, transmit a message indicating that the requested sidelink QoS will not be established.

According to some embodiments of inventive concepts, methods of operating a user equipment, UE, for device-to-device, D2D, communications are provided. Such methods include storing a preconfigured SL QoS flow management control rule set that defines operations for establishing, by the UE, a SL QoS flow, establishing a SL QoS flow by performing rules in the preconfigured SL QoS flow management control rule set, and responsive to a determination that the QoS will be fulfilled, establishing, by the UE, the SL QoS flow and mapping the SL QoS flow to a DRB.

According to some embodiments of inventive concepts, a user equipment, UE, is provided. The UE includes a transceiver, a processor coupled to the transceiver, and memory coupled with the processor. The memory stores instructions that when executed by the processor causes the user equipment to store a preconfigured SL QoS flow management control rule set that defines operations for establishing, by the UE, a SL QoS flow, establish a SL QoS flow by performing rules in the preconfigured SL QoS flow management control rule set, and, responsive to a determination that the QoS will be fulfilled, establish, by the UE, the SL QoS flow and mapping the SL QoS flow to a DRB.

According to some embodiments, a computer program product includes a non-transitory computer readable storage medium that includes computer readable program code embodied in the medium that when executed by a processor of a user equipment, UE, causes the UE to transmit a quality of service, QoS, flow establishment request, the flow establishment request indicating that the QoS flow is to be transmitted over a sidelink. The UE is further configured to, responsive to a determination that a required QoS flow will be fulfilled, receive a message indicating that a requested sidelink QoS flow will be supported and receive mapping and configuration data corresponding to the sidelink QoS flow. The UE is further configured to, responsive to determining that the required QoS may not be fulfilled, receive a message indicating that the requested sidelink QoS flow will not be established.

According to some embodiments, a computer program product includes a non-transitory computer readable storage medium that includes computer readable program code embodied in the medium that when executed by a processor of a network node, causes the network node to receive, from a user equipment, UE, a quality of service, QoS, flow establishment request, the flow establishment request indicating that the QoS flow is to be transmitted over a sidelink. The network node is further configured to determine whether a required QoS flow will be fulfilled and, in response to determining that the required QoS flow will be fulfilled, transmit a message indicating that a requested sidelink QoS will be supported and transmitting mapping and configuration data corresponding to the sidelink QoS flow. The network node is further configured to, in response to determining that the required QoS flow may not be fulfilled, transmit a message indicating that the requested sidelink QoS will not be established.

According to some embodiments, a computer program product includes a non-transitory computer readable storage medium that includes computer readable program code embodied in the medium that when executed by a processor of a user equipment, UE, causes the UE to store a preconfigured sidelink QoS flow management control rule set that defines operations for establishing, by the UE, a sidelink QoS flow. The UE is further configured to establish a sidelink QoS flow by performing rules in the preconfigured sidelink QoS flow management control rule set and, responsive to a determination that the QoS will be fulfilled, establish, by the UE, the sidelink QoS flow and mapping the sidelink QoS flow to a DRB.

According to some embodiments disclosed herein, communication resources may minimize the involvement of a CN in SL QoS flow management, which may improve efficiency.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Overview of Present Approaches and Potential Advantages:

Systems, methods, and corresponding apparatuses are disclosed below that operate to enable SL admission control and packet preemption in autonomous mode. Each SL bearer is associated with a bearer level priority indicator and a packet level priority indicator. When there are not enough resources available for SL bearer establishment or for packets transmission, one UE can preempt some booked lower priority transmissions; otherwise, the UE must release the corresponding bearer.

According to some embodiments herein, methods for enabling QoS flow management in NR SL are provided. The difference of SL QoS flow management compared to NR Uu is emphasized, and detailed procedure and signaling transmission are described. Scenarios in coverage with or without NW assistance are disclosed. Further, QoS flow information exchange between TX UE and RX UE is disclosed and additional criteria to map QoS flows into bearer based on casting scheme/session are disclosed.

In some embodiments, methods for managing SL QoS flow with and/or without NW assistance are provided. Each SL QoS flow may be associated with its QoS profiles (e.g.

5QI, ARP, GBR, MGBR etc.), and may be identified by its QoS flow ID (QFI). SL QFI may be unique within one SL session.

In NW assisted SL QoS flow management, when SL UE is in RRC_CONNECTED mode, SL QoS flow management can be controlled by the NW with limited CN involvement.

Figure 1:
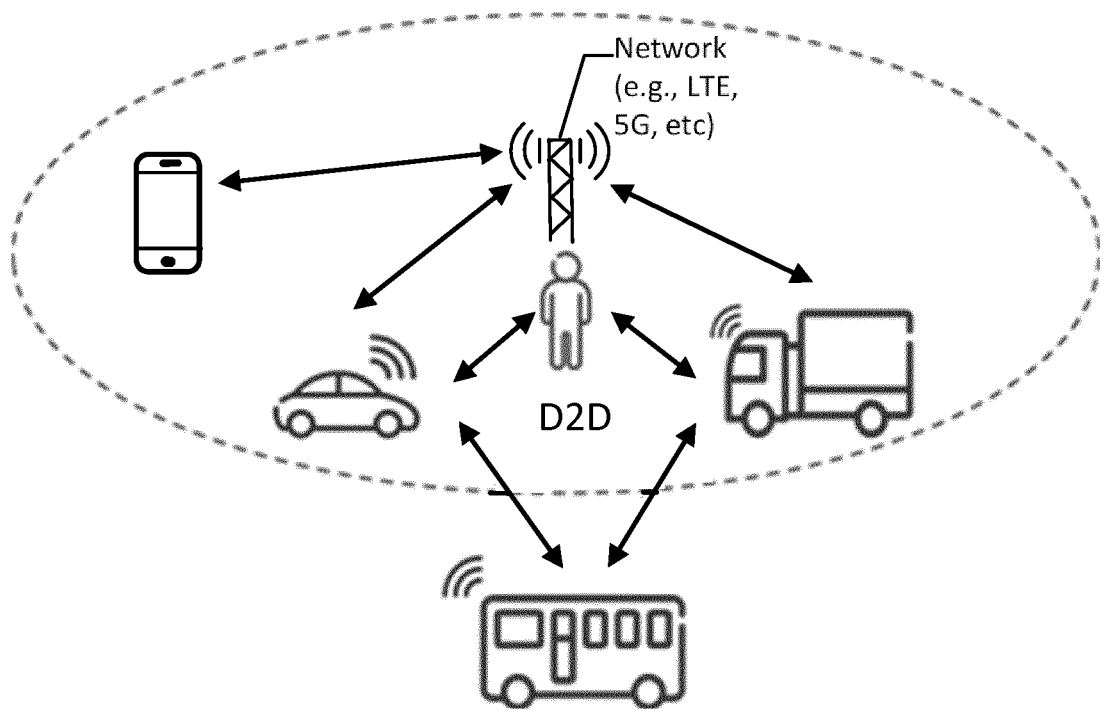
FIG. 1 illustrates an example V2X wireless communication network.
Figure 2:
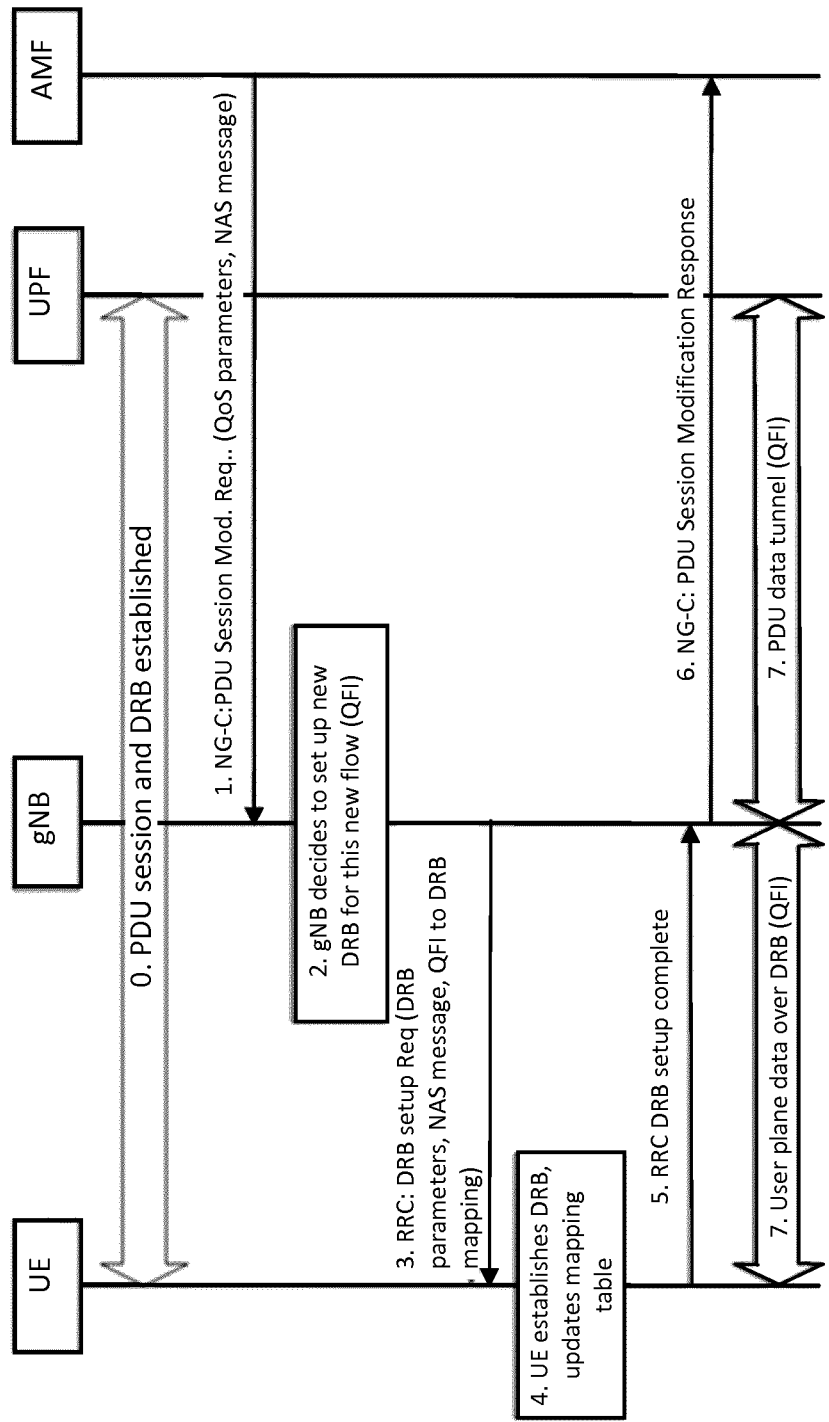
FIG. 2 is a schematic data flow diagram illustrating QoS flow establishment in NR Uu.
Figure 3:
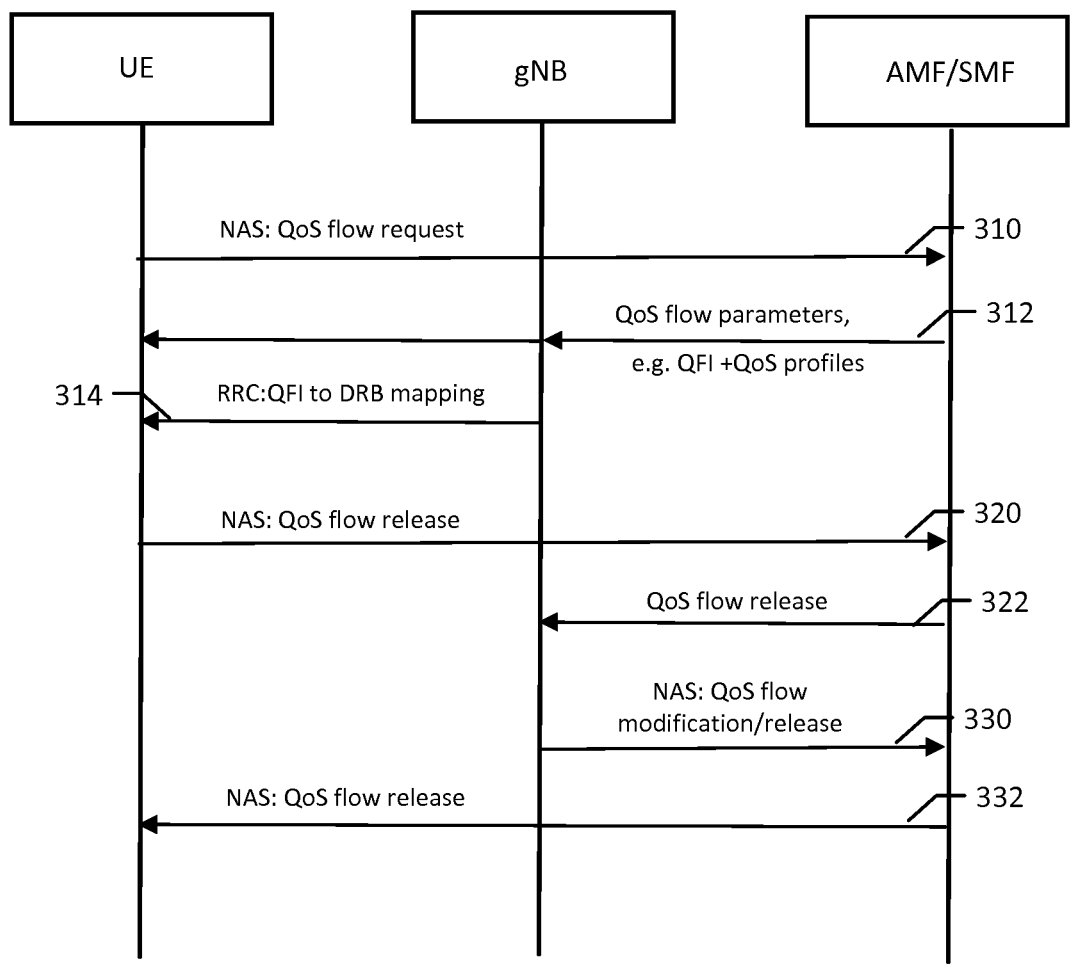
FIG. 3 is a schematic flow diagram illustrating LS QoS flow management with CN involvement according to some embodiments.

Reference is now made to FIG. 3, which is a schematic flow diagram illustrating LS QoS flow management with CN involvement according to some embodiments. In some embodiments, NAS signaling is used to perform SL QoS flow management. Only limited number of CN entities, e.g. AMF and SMF, may be involved. As illustrated, block 310 provides that establishing a SL QoS flow for a service, a QoS flow establishment request may be sent to CN, e.g. SMF, using NAS signaling. The UE may indicate in the request that the QoS flow will be transmitted over SL.

The SMF may understand that the requested QoS flow will be transmitted over SL and may generate and send a corresponding request and sends relevant SL QoS flow parameters, e.g. SL QFI and QoS profiles, to gNB via NG interface (block 312. The SMF may indicate to the gNB that the requested QoS flow will be transmitted over SL.

The gNB may understand that the requested QoS flow will be transmitted over SL and performs SL admission control (block 314). If the required QoS is estimated to be fulfilled, gNB informs the SMF that the requested QoS can be supported, the SMF then informs the UE via. NAS signaling that the requested SL QoS flow can be established. The gNB may map the requested SL QoS flow to either an existing SL DRB or a new SL DRB and send the mapping and relevant configurations to the UE via e.g. RRC signaling.

If the required QoS is estimated to be not fulfilled, gNB informs the SMF that the requested QoS cannot be supported and the SMF then informs the UE via NAS signaling that the requested SL QoS flow cannot be established.

The release of an established QoS flow can be triggered by either UE or gNB.

Some embodiments provide that the SL QoS flow release is initiated by UE. The UE may want to release one SL QoS flow, e.g. due to QoS degradation. The release request containing the associated QFI may be sent from UE to CN, e.g. SMF, via NAS signaling (block 320). The UE will then clear the relevant QoS flow context, e.g. QFI, QoS profiles, the QoS flow to DRB mapping, the UE may also clear the associated DRB when there are no other QoS flow using the same DRB. The UE may indicate in the request that the QoS flow to be released is transmitted over SL.

The CN, e.g. SMF, may generate and send a corresponding release request to gNB via NG interface (block 322). The SMF may indicate in the request that the QoS flow to be released is transmitted over SL. The CN and gNB may clear the relevant QoS flow context. The gNB may also clear the associated DRB when there are no other QoS flow using the same DRB.

In some embodiments, the SL QoS flow release may be initiated by gNB. When the gNB wants to release one SL QoS flow, e.g. to preempt some resources for new QoS flow, a release request containing the associated QFI will be sent from gNB to CN, e.g. SMF, via NG interface (block 330). The gNB may indicate in the request that the QoS flow to be released is transmitted over SL. The gNB will then clear the relevant QoS flow context, e.g. QFI, QoS profiles. the gNB clears the corresponding flow to DRB mapping and may also clear the associated DRB when there are no other QoS flow using the same DRB.

The CN, e.g. SMF, generates and sends a release request to UE via, e.g. NAS signaling (block 332). The CN and UE clear the relevant QoS flow context. The UE clears the corresponding flow to DRB mapping may also clear the associated DRB when there are no other QoS flow using the same DRB.

Figure 4:
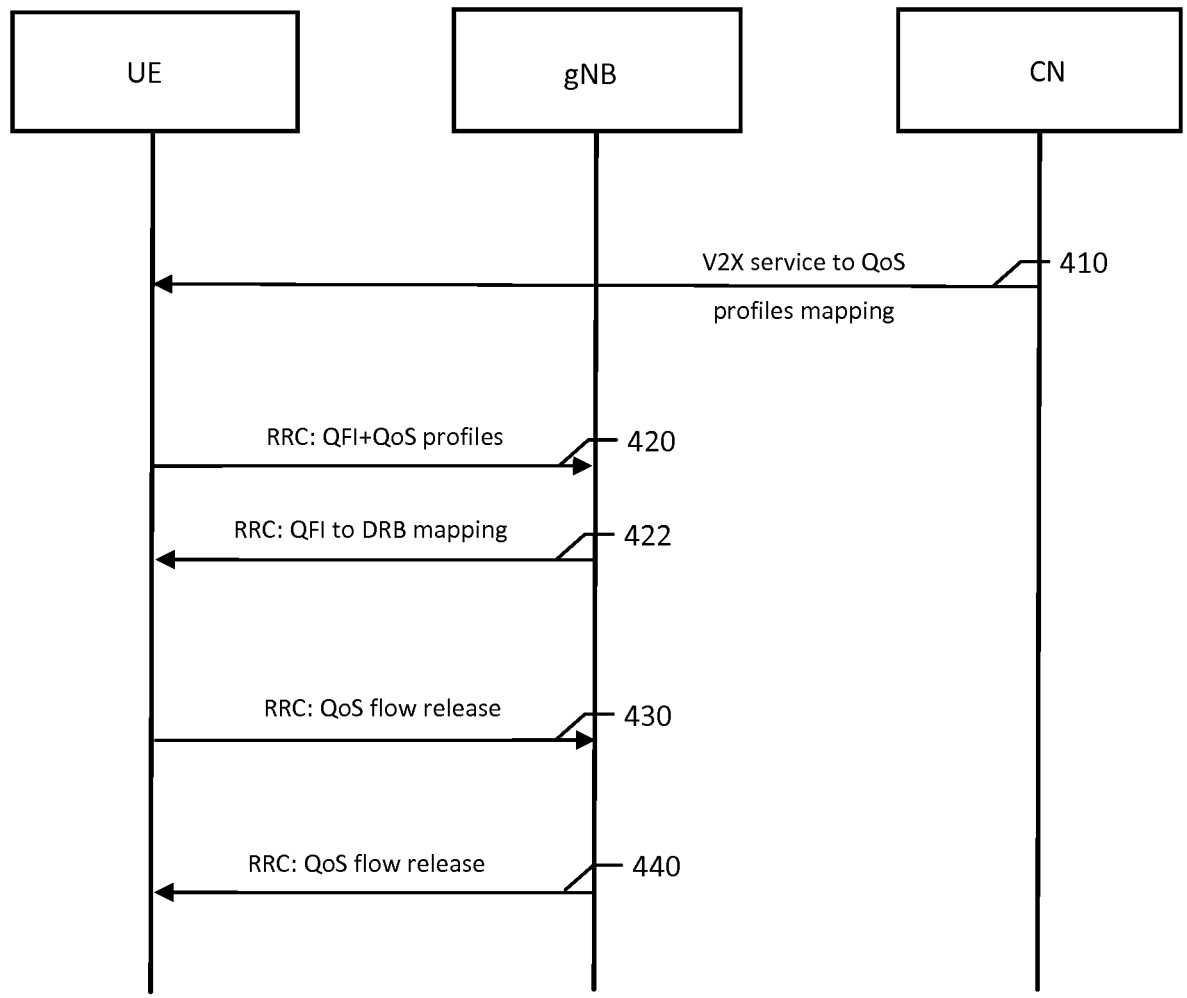
FIG. 4 is a schematic data flow diagram illustrating SL QoS flow management without CN involvement according to some embodiments.

Reference is now made to FIG. 4, which is a schematic data flow diagram illustrating SL QoS flow management without CN involvement according to some embodiments. In some embodiments, the service to SL QoS profiles mapping is (pre)configured by CN and informed to the UE (in advanced) (block 410). Later on, the SL QoS flow management may be performed only between UE and gNB without CN involvement.

QoS flow establishment may also be provided without the CN. For example, when one UE wants to establish a new SL QoS flow for a service, it may first find the associated QoS profiles according to (pre)configuration and generates a QFI for it (block 420). The info is then passed from NAS layer to AS layer within the UE and the AS layer of the UE sends a QoS flow establishment request containing the requested QFI and associated QoS profiles to gNB via RRC signaling. The UE may indicate in the request that the requested QoS flow will be transmitted over SL. Note that the QFI generation can follow some pre-defined rules, e.g. a pre-defined 5QI to QFI mapping according to some embodiments.

In some embodiments, the gNB may perform SL admission control. If the required QoS is estimated to be fulfilled, the gNB accepts the request. The gNB may map the SL QoS flow to either an existing SL DRB or a new SL DRB and sends an acknowledgement to the UE including the mapping and relevant configurations via e.g. RRC signaling (block 422). The UE then updates SL DRB configurations accordingly and informs its own upper layer that the requested SL QoS flow is accepted.

If the required QoS is estimated to be not fulfilled, the QoS flow request may be rejected. The rejection message may be sent from gNB to UE via e.g. RRC signaling. The UE informs its own upper layer that the requested SL QoS flow is rejected.

Some embodiments provide that the QoS flow release may be initiated by the UE. When the UE wants to release one SL QoS flow, e.g. due to QoS degradation, a release request containing the associated QFI may be sent from the UE to gNB via e.g. RRC signaling (block 430). The UE may indicate in the request that the QoS flow to be released is transmitted over SL. The UE and gNB will then clear the relevant QoS flow context, e.g. QFI, QoS profiles. QoS flow to DRB mapping, the UE and gNB may also clear the associated DRB when there are no other QoS flow using the same DRB.

In some embodiments, the QoS flow release may be initiated by gNB. When the gNB wants to release one SL QoS flow, e.g. to preempt some resources for new QoS flow, a release request containing the associated QFI will be sent from the gNB to UE via e.g. RRC signaling (block 440). The UE and gNB may then clear the relevant QoS flow context, e.g. QFI, QoS profiles, QoS flow to DRB mapping/The UE and gNB may also clear the associated DRB when there are no other QoS flow using the same DRB.

Some embodiments provide for autonomous SL QoS flow management. For example, when UE is out of coverage and/or in RRC_IDLE mode, the SL QoS flow management may be performed by UE itself according to pre-configuration. When one UE wants to establish a SL QoS flow, it follows preconfigured admission control rules to estimate if required QoS can be fulfilled. If the condition allows, it setups the QoS flow and maps it to existing or new DRB. When one UE wants to release a SL QoS flow, it may clear the corresponding QoS flow context and may also release the associated DRB if there are no other QoS flows using the same DRB.

Figure 5:
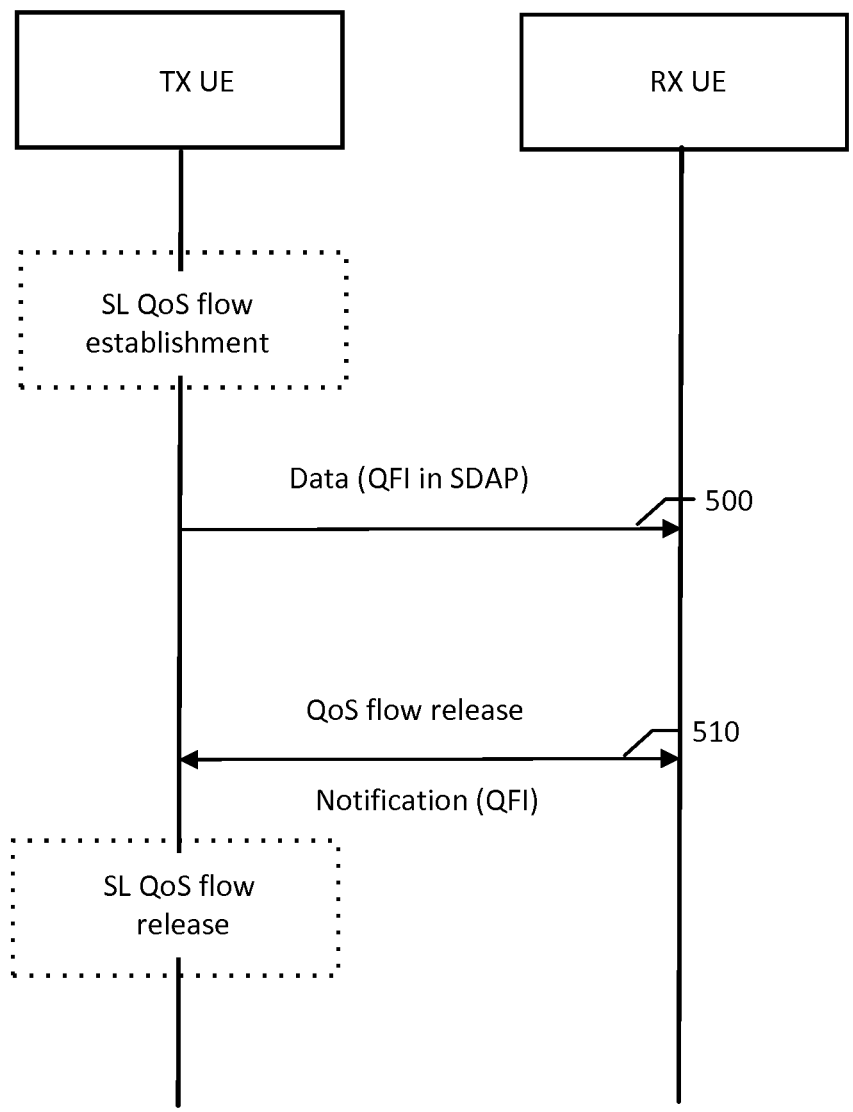
FIG. 5 is a schematic data flow diagram illustrating SL QoS flow management in SL unicast and/or groupcast according to embodiments.

Reference is now made to FIG. 5, which is a schematic data flow diagram illustrating SL QoS flow management in SL unicast and/or groupcast according to embodiments. For SL unicast/groupcast, the SL QoS flow context should be aware among involved SL UE peers. SL QoS flow establishment may be first performed by the TX UE, with/without assistance from RX UE according to embodiments herein (block 500). Once the QoS flow is established at TX side, TX UE should inform RX UE(s) with regard to the QoS flow context. In some embodiments, QFI value can be conveyed in the SDAP header during data transmission, the RX UE(s) can then recognize the SL QoS flow from QFI value and interpret the corresponding QoS characteristics and/or service type.

The SL QoS flow release can be initiated by either TX UE or RX UE or gNB, e.g. due to QoS degradation (block 510). In one embodiment, a release notification is used, e.g. one UE notifies the other UE about the planed SL QoS flow release via. e.g. NAS signaling, and associated QFI can be contained in the notification signaling. Then TX UE or gNB will execute the SL QoS flow release following embodiments herein.

Some embodiments provide that additional criteria may be used to map QoS flows into the DRB. In the following description, the terminology "casting scheme" is used to represent unicast/groupcast/broadcast transmissions. The terminology "casting session" is instead used to represent a specific V2X traffic session intended for a specific receiver (unicast) or for a specific group of UEs (groupcast). A UE may be involved in multiple casting sessions, e.g. multiple unicast session with different UEs, and for each casting session different traffics/services can be transmitted.

Both the specific casting scheme and the specific casting session can be signaled to Access Stratum by higher layers and represented by dedicated field and/or ID in Access stratum (e.g. in MAC).

The following additional criteria may be used by the UE (e.g. for the case of Autonomous SL QoS flow management as described in previous embodiments) or by the network (e.g. for the case of network-controlled QoS flow management, as described in previous embodiments). A QoS flow related to a certain V2X service can be associated/multiplexed into a radio bearer where only QoS flows related to the same service can be associated/multiplexed. The V2X service can be represented by any ID, such as ITS ID, AID, or equivalent L2 destination ID.

The method does not preclude that there are multiple radio bearers associated to the same V2X service, e.g. depending on the 5QI associated to the different QoS flows which are related to the same V2X service.

In some embodiments, a QoS flow related to a certain casting scheme can be associated/multiplexed into a radio bearer where only QoS flows associated to the same casting scheme can be associated/multiplexed. For example, if a QoS flow is associated to a traffic type which is supposed to be transmitted in broadcast fashion, such QoS flow can be multiplexed into a radio bearer where only broadcast type of traffics can be multiplexed/associated. The method does not preclude that there are multiple radio bearers associated to the same casting scheme, e.g. depending on the 5QI associated to the QoS flow associated to the different QoS flows which are related to the same casting scheme.

Some embodiments provide that a QoS flow related to a certain casting session can be associated/multiplexed into a radio bearer where only QoS flows associated to the same casting session can be associated/multiplexed. For example, if a QoS flow is associated to a traffic type which is supposed to be transmitted in unicast/groupcast fashion and intended for a specific receiver or group of receivers, i.e. associated to a specific casting session, such QoS flow can be multiplexed into a radio bearer where only traffics intended for the same receiver or group of receivers, i.e. casting session, can be associated/multiplexed. The method does not preclude that there are multiple radio bearers associated to the same casting session, i.e. same receiver or group of receivers, for example depending on the 5QI associated to the QoS flow associated to the different QoS flows which are related to the same casting scheme.

A combination of the above criteria, e.g. a QoS flow related to a certain casting scheme and V2X service can be associated/multiplexed into a radio bearer where only QoS flows associated to the same casting scheme and V2X service can be associated/multiplexed.

To support the above, specific radio bearer ID and logical channel ID can be associated. For example, in one embodiment, a set of radio bearer ID/LCID can be associated to represent radio bearers associated to the same V2X service, and/or the same casting scheme. In one embodiment, among the set of IDs reserved for the same casting scheme, the UE may select different IDs to represent different casting session. In another embodiment, among the set of IDs reserved to the same V2X service, different IDs can be used to represent different casting scheme.

Additional criteria may be used in the MAC layer to handle multiplexing of the QoS flows into a MAC PDU, as part of the logical channel prioritization procedure. Following criteria can include that a MAC layer multiplexes into the same MAC PDU only radio bearers, with associated QoS flows, which are associated to the same V2X service. A MAC layer may multiplex into the same MAC PDU only radio bearers, with associated QoS flows, which are associated to the same casting scheme. A MAC layer may multiplex into the same MAC PDU only radio bearers, with associated QoS flows, which are associated to the same casting session. Any combination of the above criteria may be included. For example, a UE may multiplex in the same MAC PDU only traffic which is carrying the same V2X service and which is associated to the same casting scheme and/or to the same casting session.

Figure 6:
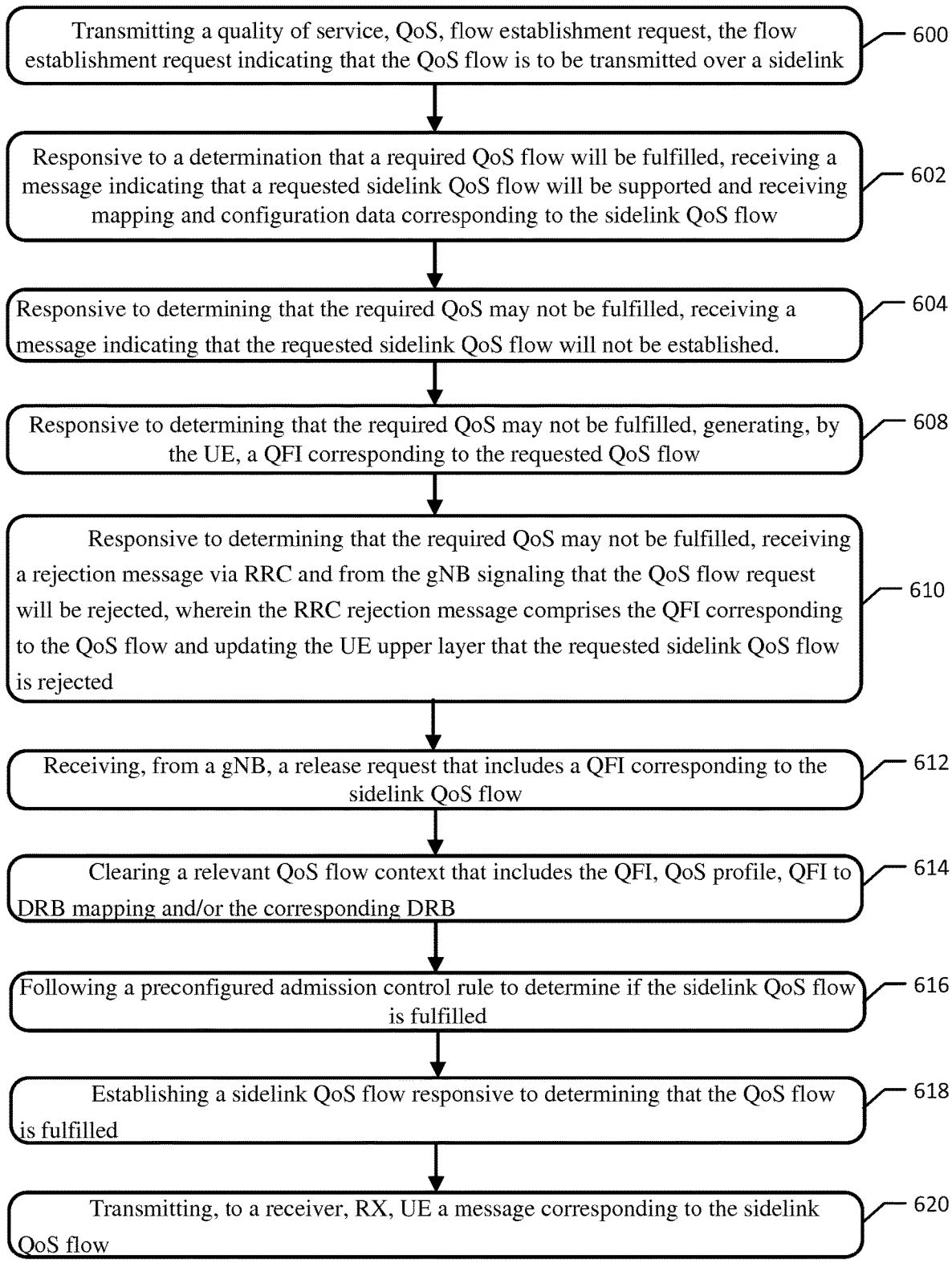
FIG. 6 is a flow chart illustrating operations of methods, systems and apparatus according to some embodiments.

Reference is now made to FIG. 6, which is a flow chart illustrating operations of methods, systems and apparatus according to some embodiments. Methods of operating a user equipment, UE, for device-to-device, D2D, communications include transmitting a quality of service, QoS, flow establishment request, the flow establishment request indicating that the QoS flow is to be transmitted over a sidelink (block 600). Operations may include, responsive to a determination that a required QoS flow will be fulfilled, receiving a message indicating that a requested sidelink QoS flow will be supported and receiving mapping and configuration data corresponding to the sidelink QoS flow (block 602) and responsive to determining that the required QoS may not be fulfilled, receiving a message indicating that the requested sidelink QoS flow will not be established (block 604).

In some embodiments, operations may include, responsive to determining that the required QoS may not be fulfilled, generating, by the UE, a QFI corresponding to the requested QoS flow (block 608). Some embodiments provide transmitting a QoS flow release request that includes a QoS flow identifier, QFI, that identifies a corresponding sidelink QoS flow and clearing a relevant QoS flow context, wherein the relevant QoS flow context comprises QFI, QoS profiles, QFI to radio data bearer, DRB, mapping and/or the corresponding DRB.

In some embodiments, the mapping and configuration data are preconfigured by a core network and received by the UE, wherein transmitting the QoS flow establishment request comprises transmitting the QoS flow establishment request via radio resource control, RRC, signaling to a gNB, and wherein the QoS flow establishment request comprises QoS flow related data that was preconfigured and indication that the requested QoS flow will be transmitted over the sidelink QoS flow.

Some embodiments provide that transmitting the QoS flow establishment request comprises transmitting the release request to a core network, CN, via NAS signaling. In some embodiments, an acknowledgement message may be received from the gNB via RRC signaling that includes relevant mapping and configurations corresponding to the sidelink QoS flow. The sidelink QoS DRB configurations may be updated and a UE upper layer may be informed that the requested sidelink QoS flow is accepted.

Some embodiments provide that responsive to determining that the required QoS may not be fulfilled, operations may include receiving a rejection message via RRC and from the gNB signaling that the QoS flow request will be rejected, wherein the RRC rejection message comprises the QFI corresponding to the QoS flow and updating the UE upper layer that the requested sidelink QoS flow is rejected (block 610).

Some embodiments provide receiving, from a gNB, a release request that includes a QFI corresponding to the sidelink QoS flow (block 612) and clearing a relevant QoS flow context that includes the QFI, QoS profile, QFI to DRB mapping and/or the corresponding DRB (block 614).

Some embodiments provide that a gNB is caused to release the QoS flow and delete relevant QoS context data. In some embodiments, responsive to QoS degradation of a sidelink QoS flow, a release request may be transmitted that includes a QFI corresponding to the sidelink QoS flow. Methods include clearing a relevant QoS flow context that includes the QFI, QoS profile, QFI to DRB mapping and/or the corresponding DRB (block 614) wherein a gNB is caused to release the QoS flow and delete relevant QoS context data.

In some embodiments, transmitting the release request comprises transmitting the release request to a core network, CN, via NAS signaling. In some embodiments, in response to determining that no other QoS flows are being used by a same DRB, the release request includes a request to release the DRB.

Some embodiments include following a preconfigured admission control rule to determine if the sidelink QoS flow is fulfilled (block 616) and establishing a sidelink QoS flow responsive to determining that the QoS flow is fulfilled (block 618).

In some embodiments, the UE comprises a transmitter, TX, UE, wherein responsive to establishing the sidelink QoS flow, operations include transmitting, to a receiver, RX, UE a message corresponding to the sidelink QoS flow (block 620). In some embodiments, the message comprises the QFI value during data transmission and that causes the RX UE to determine a QoS characteristic and/or service type.

Figure 7:
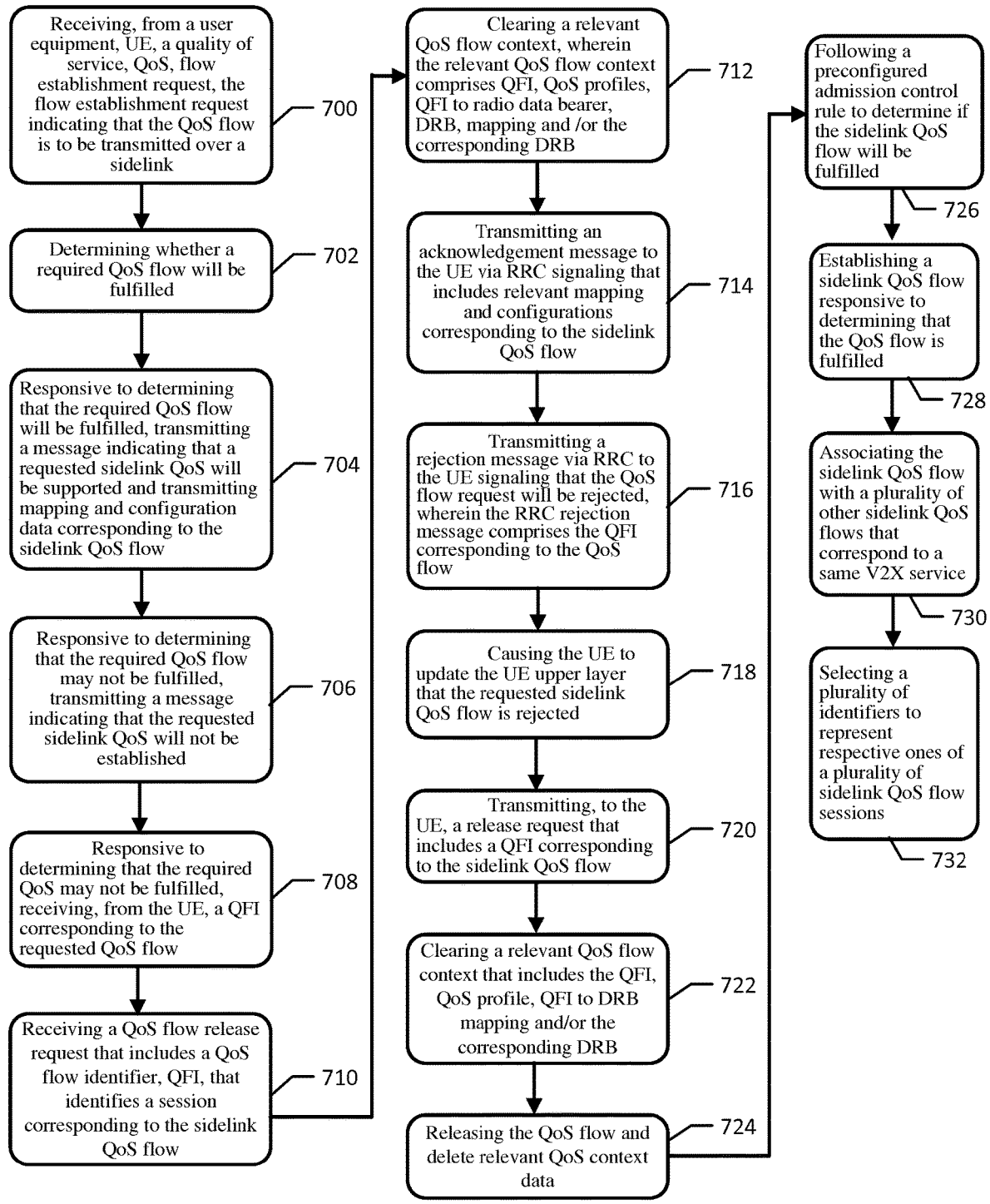
FIG. 7 is a flow chart illustrating operations of methods, systems and apparatus according to some embodiments.

Reference is now made to FIG. 7, which is a flow chart illustrating operations of methods, systems and apparatus according to some embodiments. Methods of operating a network node for providing network assisted sidelink quality of service flow management may include receiving, from a user equipment, UE, a quality of service, QoS, flow establishment request, the flow establishment request indicating that the QoS flow is to be transmitted over a sidelink (block 700), determining whether a required QoS flow will be fulfilled (block 702), and, in response to determining that the required QoS flow will be fulfilled, transmitting a message indicating that a requested sidelink QoS will be supported and transmitting mapping and configuration data corresponding to the sidelink QoS flow (block 704). Methods further include, in response to determining that the required QoS flow may not be fulfilled, transmitting a message indicating that the requested sidelink QoS will not be established (block 706).

In some embodiments, methods include, responsive to determining that the required QoS may not be fulfilled, receiving, from the UE, a QFI corresponding to the requested QoS flow (block 708). Some embodiments include receiving a QoS flow release request that includes a QoS flow identifier, QFI, that identifies a session corresponding to the sidelink QoS flow (block 710) and clearing a relevant QoS flow context (block 712). In some embodiments, the relevant QoS flow context comprises QFI, QoS profiles, QFI to radio data bearer, DRB, mapping and/or the corresponding DRB.

Some embodiments provide that the mapping and configuration data are preconfigured by a core network and transmitted to the UE and that receiving the QoS flow establishment request includes receiving the QoS establishment request directly from the UE via radio resource control, RRC, signaling to a gNB. In some embodiments, the QoS establishment request includes QoS flow related data that was preconfigured and indication that the requested QoS flow will be transmitted over the sidelink QoS flow.

Some embodiments include transmitting an acknowledgement message to the UE via RRC signaling that includes relevant mapping and configurations corresponding to the sidelink QoS flow (block 714). responsive to determining that the required QoS may not be fulfilled, operations may further include transmitting a rejection message via RRC to the UE signaling that the QoS flow request will be rejected, wherein the RRC rejection message comprises the QFI corresponding to the QoS flow (block 716) and causing the UE to update the UE upper layer that the requested sidelink QoS flow is rejected (block 718).

Some embodiments include transmitting, to the UE, a release request that includes a QFI corresponding to the sidelink QoS flow (block 720), clearing a relevant QoS flow context that includes the QFI, QoS profile, QFI to DRB mapping and/or the corresponding DRB (block 722) and releasing the QoS flow and delete relevant QoS context data (block 724).

Some embodiments include following a preconfigured admission control rule to determine if the sidelink QoS flow will be fulfilled (block 726) and establishing a sidelink QoS flow responsive to determining that the QoS flow is fulfilled (block 728).

Operations may further include associating the sidelink QoS flow with a plurality of other sidelink QoS flows that correspond to a same V2X service (block 730) and selecting a plurality of identifiers to represent respective ones of a plurality of sidelink QoS flow sessions (block 732).

Figure 8:
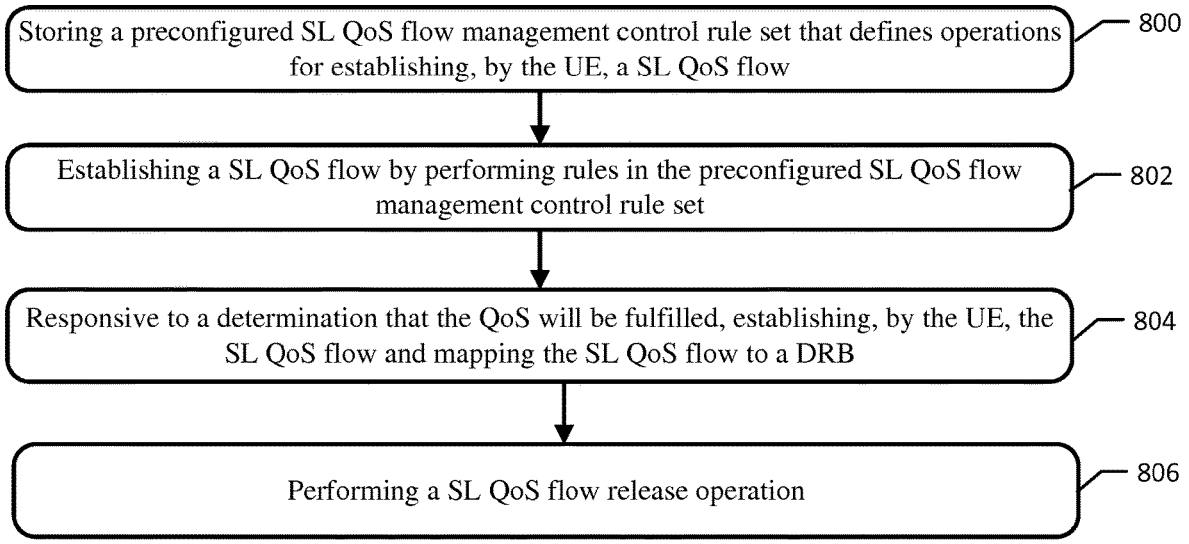
FIG. 8, which is a flow chart illustrating operations of methods, systems and apparatus according to some embodiments.

Reference is now made to FIG. 8, which is a flow chart illustrating operations of methods, systems and apparatus according to some embodiments. Methods of operating a user equipment, UE, for device-to-device, D2D, communications may include storing a preconfigured SL QoS flow management control rule set that defines operations for establishing, by the UE, a SL QoS flow (block 800). Embodiments may include establishing a SL QoS flow by performing rules in the preconfigured SL QoS flow management control rule set (block 802). Operations may include, responsive to a determination that the QoS will be fulfilled, establishing, by the UE, the SL QoS flow and mapping the SL QoS flow to a DRB (block 804).

In some embodiments, the DRB comprises an existing DRB or a new DRB. Some embodiments provide performing a SL QoS flow release operation (block 806). Some embodiments provide that the release operation includes clearing a QoS flow context and releasing the DRB if no other QoS flows are using the DRB. In some embodiments, the QoS flow that is related to a given V2X service is associated with a DRB and only other QoS flows that are related to the given V2X service are associated with the DRB.

Figure 9:
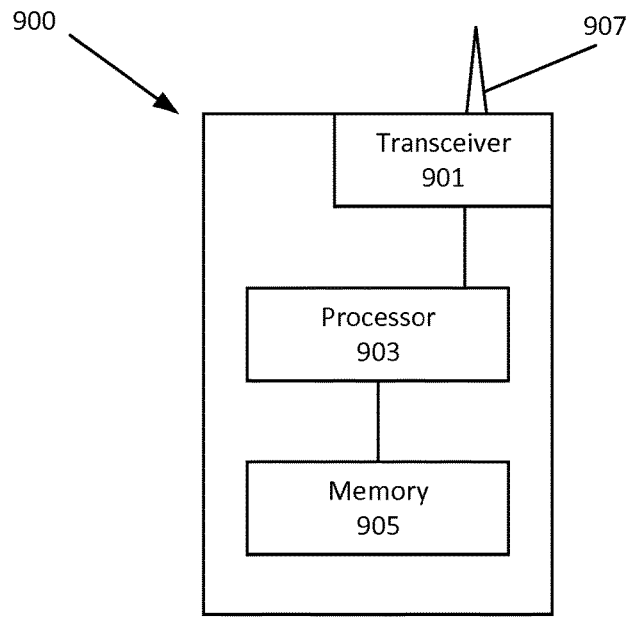
FIG. 9 is a block diagram illustrating a wireless device UE having components configured according to some embodiments.

FIG. 9 is a block diagram illustrating elements of a wireless device UE 900 (also referred to as a wireless terminal, a wireless communication device, a wireless communication terminal, user equipment, UE, a user equipment node/terminal/device, etc.) configured to provide wireless communication according to embodiments of inventive concepts. As shown, the UE may include an antenna 9007, and a transceiver circuit 9001 (also referred to as a transceiver) including a transmitter and a receiver configured to provide uplink and downlink radio communications with other UEs (e.g., SL communications), a radio access network RAN node (e.g., a base station, eNB, gNB, network node, etc.) of a wireless communication network. UE 900 may also include a processor circuit 903 (also referred to as a processor) coupled to the transceiver circuit, and a memory circuit 905 (also referred to as memory) coupled to the processor circuit. The memory circuit 905 may include computer readable program code that when executed by the processor circuit 903 causes the processor circuit to perform operations according to embodiments disclosed herein. According to other embodiments, processor circuit 3 may be defined to include memory so that a separate memory circuit is not required. UE 900 may also include an interface (such as a user interface) coupled with processor and a three, and/or wireless device UE may be an IoT and/or MTC device.

As discussed herein, operations of wireless device UE 900 may be performed by processor 903 and/or transceiver 901. For example, processor 903 may control transceiver 901 to transmit uplink communications through transceiver 901 over a radio interface to another UE and/or a RAN node of a wireless communication network and/or to receive downlink communications through transceiver 901 from another UE and/or a RAN node of the wireless communication network over a radio interface. Moreover, modules may be stored in memory 905, and these modules may provide instructions so that when instructions of a module are executed by processor 903, processor 903 performs respective operations (e.g., operations discussed below with respect to Example Embodiments).

Figure 10:
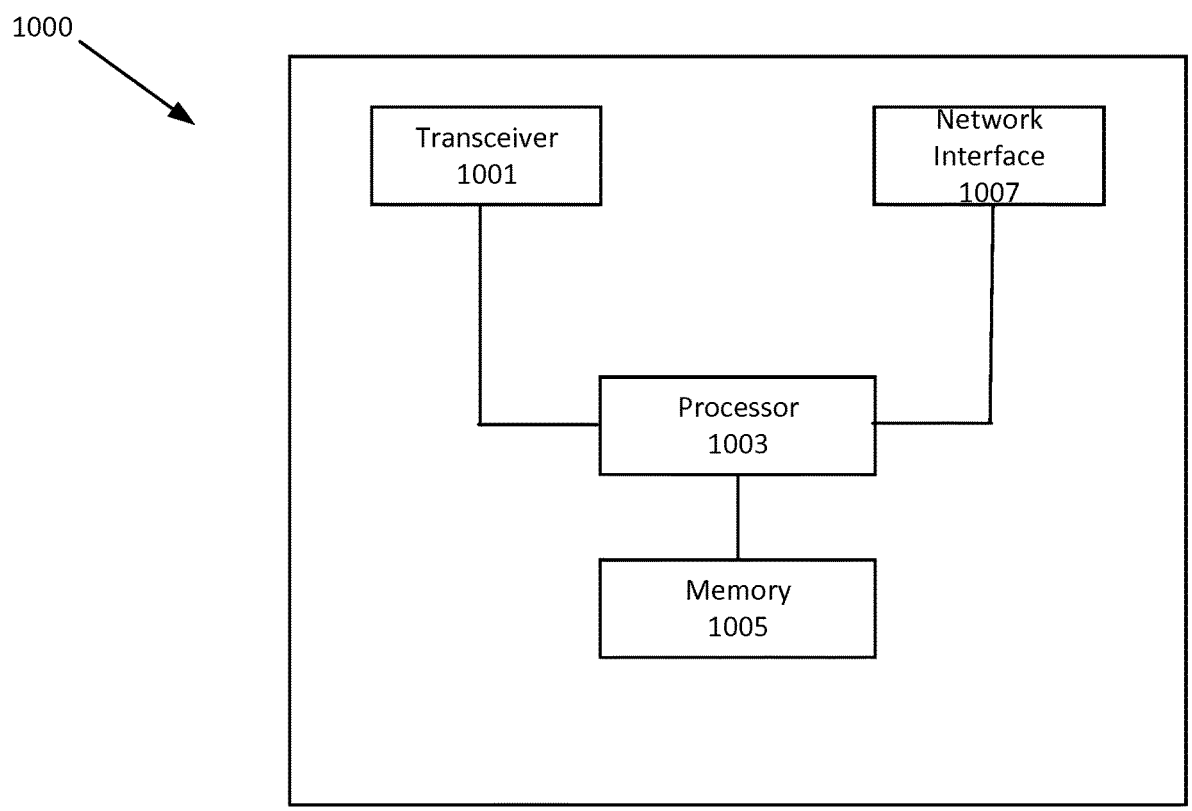
FIG. 10 is a block diagram illustrating a network node according to some embodiments of inventive concepts.

FIG. 10 is a block diagram illustrating elements of a node 1000 (also referred to as a network node, base station, eNB, eNodeB, gNB, gNodeB, etc.) of a Radio Access Network (RAN) configured to provide cellular communication according to embodiments of inventive concepts. As shown, the network node may include a transceiver circuit 1001 (also referred to as a transceiver) including a transmitter and a receiver configured to provide uplink and downlink radio communications with wireless communication devices UEs. The network node may include a network interface circuit 1007 (also referred to as a network interface) configured to provide communications with other nodes (e.g., with other base stations and/or core network nodes) of the RAN and/or core network. The network node may also include a processor circuit 1003 (also referred to as a processor) coupled to the transceiver circuit, and a memory circuit 1005 (also referred to as memory) coupled to the processor circuit. The memory circuit 1005 may include computer readable program code that when executed by the processor circuit 1003 causes the processor circuit to perform operations according to embodiments disclosed herein. According to other embodiments, processor circuit 1003 may be defined to include memory so that a separate memory circuit is not required.

As discussed herein, operations of the network node may be performed by processor 1003, network interface 1007, and/or transceiver 1001. For example, processor 1003 may control transceiver 1001 to transmit communications through transceiver 1001 over a radio interface to one or more UEs and/or to receive communications through transceiver 1001 from one or more UEs over a radio interface. Similarly, processor 1003 may control network interface 1007 to transmit communications through network interface 1007 to one or more other network nodes and/or to receive communications through network interface from one or more other network nodes. Moreover, modules may be stored in memory 1005, and these modules may provide instructions so that when instructions of a module are executed by processor 1003, processor 1003 performs respective operations (e.g., operations discussed below with respect to Example Embodiments).

Listing of Embodiments

1. A method of operating a user equipment, UE, for device-to-device, D2D, communications, the method comprising:
  transmitting a quality of service, QoS, flow establishment request, the flow establishment request indicating that the QoS flow is to be transmitted over a sidelink;
  responsive to a determination that a required QoS flow will be fulfilled, receiving a message indicating that a requested sidelink QoS flow will be supported and receiving mapping and configuration data corresponding to the sidelink QoS flow; and responsive to determining that the required QoS may not be fulfilled, receiving a message indicating that the requested sidelink QoS flow will not be established.

2. The method of embodiment 1, the method further comprising responsive to determining that the required QoS may not be fulfilled, generating, by the UE, a QFI corresponding to the requested QoS flow.

3. The method of any of embodiments 1 and 2, further comprising: transmitting a QoS flow release request that includes a QoS flow identifier, QFI, that identifies a corresponding sidelink QoS flow; and
  clearing a relevant QoS flow context, wherein the relevant QoS flow context comprises QFI, QoS profiles, QFI to radio data bearer, DRB, mapping and/or the corresponding DRB.

4. The method of any of embodiments 1-3, wherein the mapping and configuration data are preconfigured by a core network and received by the UE, wherein transmitting the QoS flow establishment request comprises transmitting the QoS flow establishment request via radio resource control, RRC, signaling to a gNB, and wherein the QoS flow establishment request comprises QoS flow related data that was preconfigured and indication that the requested QoS flow will be transmitted over the sidelink QoS flow.

5. The method of any of embodiments 1-4, wherein transmitting the QoS flow establishment request comprises transmitting the release request to a core network, CN, via NAS signaling.

6. The method of embodiment 5, further comprising receiving an acknowledgement message from the gNB via RRC signaling that includes relevant mapping and configurations corresponding to the sidelink QoS flow.

7. The method of embodiment 6, further comprising updating the sidelink QoS DRB configurations and informing a UE upper layer that the requested sidelink QoS flow is accepted.

8. The method of any of embodiments 1-7, wherein responsive to determining that the required QoS may not be fulfilled, the method further comprising:
  receiving a rejection message via RRC and from the gNB signaling that the QoS flow request will be rejected, wherein the RRC rejection message comprises the QFI corresponding to the QoS flow; and
  updating the UE upper layer that the requested sidelink QoS flow is rejected.

9. The method of embodiments 1-8, wherein the method further comprises:
  receiving, from a gNB, a release request that includes a QFI corresponding to the sidelink QoS flow; and
  clearing a relevant QoS flow context that includes the QFI, QoS profile, QFI to DRB mapping and/or the corresponding DRB,
  wherein a gNB is caused to release the QoS flow and delete relevant QoS context data.

10. The method of any of embodiments 1-9, wherein responsive to QoS degradation of a sidelink QoS flow, the method further comprises:
  transmitting a release request that includes a QFI corresponding to the sidelink QoS flow; and
  clearing a relevant QoS flow context that includes the QFI, QoS profile, QFI to DRB mapping and/or the corresponding DRB,
  wherein a gNB is caused to release the QoS flow and delete relevant QoS context data.

11. The method of embodiment 10, wherein transmitting the release request comprises transmitting the release request to a core network, CN, via NAS signaling.

12. The method of embodiment 10, wherein in response to determining that no other QoS flows are being used by a same DRB, the release request includes a request to release the DRB.

13. The method of any of embodiments 1-12, further comprising:
  following a preconfigured admission control rule to determine if the sidelink QoS flow is fulfilled; and
  establishing a sidelink QoS flow responsive to determining that the QoS flow is fulfilled.

14. The method of any of embodiments 1-13, wherein the UE comprises a transmitter, TX, UE, wherein responsive to establishing the sidelink QoS flow, the method further comprises transmitting, to a receiver, RX, UE a message corresponding to the sidelink QoS flow,
  wherein the message comprises the QFI value during data transmission and that causes the RX UE to determine a QoS characteristic and/or service type.

15. The method of embodiment 14, wherein the TX UE is further configured to initiate a sidelink QoS flow release based on a QoS degradation.

16. The method of any of embodiments 14-15, wherein the TX UE is further configured to receive, from the RX UE, a sidelink QoS flow release based on a QoS degradation.

17. The method of any of embodiments 1-16, wherein a unicast sidelink QoS flow comprises a specific V2X traffic session that is transmitted to a specific RX UE.

18. The method of any of embodiments 1-16, wherein a groupcast sidelink QoS flow comprises a specific V2X traffic session that is transmitted to a specific group of RX UEs.

19. The method of any of embodiments 1-18, further comprising associating the sidelink QoS flow with a plurality of other sidelink QoS flows that correspond to a same V2X service.

20. The method of any of embodiments 1-19, wherein the same V2X service is represented by a unique identifier.

21. The method of any of embodiments 1-20, wherein the same V2X service is associated with a plurality of radio bearers.

22. The method of any of embodiments 1-21, further comprising selecting a plurality of identifiers to represent respective ones of a plurality of sidelink QoS flows.

23. The method of any of embodiments 1 to 21, wherein the service is a vehicle to anything, V2X, service.

24. The method of any of embodiments 1-23,
  wherein the QoS flow that is related to a given V2X service is associated with a DRB, and
  wherein only other QoS flows that are related to the given V2X service are associated with the DRB.

25. The method of any of embodiments 1-24,
  wherein the QoS flow that is related to a given V2X service is multiplexed into a DRB, and
  wherein only other QoS flows that are related to the given V2X service are multiplexed into the DRB.

26. The method of any of embodiments 1-25,
  wherein the QoS flow that is related to a given casting scheme is associated with a DRB, and
  wherein only QoS flows that are associated with the given casting scheme are associated with the DRB.

27. The method of any of embodiments 1-26,
  wherein the QoS flow that is related to a given casting scheme is multiplexed into a DRB, and
  wherein only QoS flows that are multiplexed into the given casting scheme are associated with the DRB.

28. The method of any of embodiments 1-27,
  wherein the QoS flow that is related to a given casting session is associated with a DRB, and
  wherein only QoS flows that are associated with the given casting session are associated with the DRB.

29. The method of any of embodiments 1-28,
  wherein the QoS flow that is related to a given casting session is multiplexed into a DRB, and
  wherein only QoS flows that are multiplexed into the given casting session are associated with the DRB.

30. The method according to any combination of embodiments 24-29.

31. The method of any of embodiments 1-30, wherein a MAC layer multiplexes into the same MAC PDU as DRBs having QoS flows that are associated with a same V2X service.

32. The method of any of embodiments 1-31, wherein a MAC layer multiplexes into the same MAC PDU as DRBs having QoS flows that are associated with a same casting scheme.

33. The method of any of embodiments 1-32, wherein a MAC layer multiplexes into the same MAC PDU as DRBs having QoS flows that are associated with a same casting session.

34. A user equipment, UE, adapted to perform according to any of Embodiments 1 to 33.

35. A user equipment, UE, comprising:
transceiver;
a processor coupled to the transceiver; and
memory coupled with the processor, wherein the memory stores instructions that when executed by the processor causes the UE to perform operations according to any of Embodiments 1 to 33.

36. A computer program product, comprising:
a non-transitory computer readable storage medium comprising computer readable program code embodied in the medium that when executed by a processor of a user equipment, UE, causes the UE to perform operations according to any of embodiments 1 to 33.

37. A method of operating a network node for providing network assisted sidelink quality of service flow management, method comprising:
receiving, from a user equipment, UE, a quality of service, QoS, flow establishment request, the flow establishment request indicating that the QoS flow is to be transmitted over a sidelink;
determining whether a required QoS flow will be fulfilled;
in response to determining that the required QoS flow will be fulfilled, transmitting a message indicating that a requested sidelink QoS will be supported and transmitting mapping and configuration data corresponding to the sidelink QoS flow; and
in response to determining that the required QoS flow may not be fulfilled, transmitting a message indicating that the requested sidelink QoS will not be established.

38. The method of embodiments 37, wherein responsive to determining that the required QoS may not be fulfilled, receiving, from the UE, a QFI corresponding to the requested QoS flow.

39. The method of embodiment 38, further comprising:
receiving a QoS flow release request that includes a QoS flow identifier, QFI, that identifies a session corresponding to the sidelink QoS flow; and
clearing a relevant QoS flow context, wherein the relevant QoS flow context comprises QFI, QoS profiles, QFI to radio data bearer, DRB, mapping and/or the corresponding DRB.

40. The method of any of embodiments 37-39, wherein the mapping and configuration data are preconfigured by a core network and transmitted to the UE,
wherein receiving the QoS flow establishment request comprises receiving the QoS establishment request directly from the UE via radio resource control, RRC, signaling to a gNB, and
wherein the QoS establishment request comprises QoS flow related data that was preconfigured and indication that the requested QoS flow will be transmitted over the sidelink QoS flow.

41. The method of any of embodiments 37-40, wherein the mapping and configuration data are preconfigured by a core network and transmitted to the UE,
wherein receiving the QoS flow establishment request comprises receiving the QoS establishment request via a NAS message from the core network radio resource control, RRC, signaling to a gNB, and
wherein the QoS establishment request comprises QoS flow related data that was preconfigured and indication that the requested QoS flow will be transmitted over the sidelink QoS flow.

42. The method of any of embodiments 37-40, wherein the mapping and configuration data are preconfigured by a core network and transmitted to the UE,
wherein receiving the QoS flow establishment request comprises receiving the QoS establishment request via radio resource control, RRC, signaling to a gNB, and
wherein the QoS establishment request comprises QoS flow related data that was preconfigured and indication that the requested QoS flow will be transmitted over the sidelink QoS flow.

43. The method of any of embodiments 37-42, wherein receiving the QoS flow establishment request comprises transmitting the release request to a core network, CN, via NAS signaling.

44. The method of embodiment 43, further comprising transmitting an acknowledgement message to the UE via RRC signaling that includes relevant mapping and configurations corresponding to the sidelink QoS flow.

45. The method of any of embodiments 37-44, wherein responsive to determining that the required QoS may not be fulfilled, the method further comprising:
transmitting a rejection message via RRC to the UE signaling that the QoS flow request will be rejected, wherein the RRC rejection message comprises the QFI corresponding to the QoS flow; and
causing the UE to update the UE upper layer that the requested sidelink QoS flow is rejected.

46. The method of embodiments 37-45, further comprising:
transmitting, to the UE, a release request that includes a QFI corresponding to the sidelink QoS flow;
clearing a relevant QoS flow context that includes the QFI, QoS profile, QFI to DRB mapping and/or the corresponding DRB; and
releasing the QoS flow and delete relevant QoS context data.

47. The method of any of embodiments 37-45, wherein responsive to QoS degradation of a sidelink QoS flow, the method further comprises:
transmitting a release request that includes a QFI corresponding to the sidelink QoS flow;
causing a relevant QoS context in the UE that includes the QFI and/or QoS profile data to be cleared; and
releasing the QoS flow.

48. The method of embodiment 47, wherein transmitting the release request comprises transmitting the release request to a core network, CN, and wherein the core network informs the UE via NAS signaling.

49. The method of embodiment 37-48, wherein in response to determining that no other QoS flows are being used by a same DRB, the release request includes a request to release the DRB.

50. The method of any of embodiments 37-49, further comprising:
following a preconfigured admission control rule to determine if the sidelink QoS flow will be fulfilled; and
establishing a sidelink QoS flow responsive to determining that the QoS flow is fulfilled.

51. The method of any of embodiments 37-50, wherein a unicast sidelink QoS flow session comprises a specific V2X traffic session that is transmitted to a specific RX UE.

52. The method of any of embodiments 37-50, wherein a groupcast sidelink QoS flow session comprises a specific V2X traffic session that is transmitted to a specific group of RX UEs.

53. The method of any of embodiments 37-52, further comprising associating the sidelink QoS flow with a plurality of other sidelink QoS flows that correspond to a same V2X service.

54. The method of any of embodiments 37-53, wherein the same V2X service is represented by a unique identifier.

55. The method of any of embodiments 37-54, wherein the same V2X service is associated with a plurality of radio bearers.

56. The method of any of embodiments 37-55, further comprising selecting a plurality of identifiers to represent respective ones of a plurality of sidelink QoS flow sessions.

57. The method of any of embodiments 37 to 56, wherein the service is a vehicle to anything, V2X, service.

58. The method of any of embodiments 37-57,
wherein the QoS flow that is related to a given V2X service is associated with a DRB, and
wherein only other QoS flows that are related to the given V2X service are associated with the DRB.

59. The method of any of embodiments 37-58,
wherein the QoS flow that is related to a given V2X service is multiplexed into a DRB, and
wherein only other QoS flows that are related to the given V2X service are multiplexed into the DRB.

60. The method of any of embodiments 37-59,
wherein the QoS flow that is related to a given casting scheme is associated with a DRB, and
wherein only QoS flows that are associated with the given casting scheme are associated with the DRB.

61. The method of any of embodiments 37-60,
wherein the QoS flow that is related to a given casting scheme is multiplexed into a DRB, and
wherein only QoS flows that are multiplexed into the given casting scheme are associated with the DRB.

62. The method of any of embodiments 37-61,
wherein the QoS flow that is related to a given casting session is associated with a DRB, and
wherein only QoS flows that are associated with the given casting session are associated with the DRB.

63. The method of any of embodiments 37-62,
wherein the QoS flow that is related to a given casting session is multiplexed into a DRB, and
wherein only QoS flows that are multiplexed into the given casting session are associated with the DRB.

64. The method according to any combination of embodiments 58-63.

65. The method of any of embodiments 37-64, wherein a MAC layer multiplexes into the same MAC PDU as DRBs having QoS flows that are associated with a same V2X service.

66. The method of any of embodiments 37-67, wherein a MAC layer multiplexes into the same MAC PDU as DRBs having QoS flows that are associated with a same casting scheme.

67. The method of any of embodiments 37-66, wherein a MAC layer multiplexes into the same MAC PDU as DRBs having QoS flows that are associated with a same casting session.

68. The method according to any combination of embodiments 65-67.

70. A network node adapted to perform according to any of embodiments 37 to 68.

71. A network node comprising:
transceiver;
a processor coupled to the transceiver; and
memory coupled with the processor, wherein the memory stores instructions that when executed by the processor causes the network node to perform operations according to any of Embodiments 37 to 68.

72. A computer program product, comprising:
a non-transitory computer readable storage medium comprising computer readable program code embodied in the medium that when executed by a processor of a network node, causes the network node to perform operations according to any of Embodiments 37 to 68.

73. A method of operating a user equipment, UE, for device-to-device, D2D, communications, the method comprising:
storing a preconfigured SL QoS flow management control rule set that defines operations for establishing, by the UE, a SL QoS flow;
establishing a SL QoS flow by performing rules in the preconfigured SL QoS flow management control rule set; and
responsive to a determination that the QoS will be fulfilled, establishing, by the UE, the SL QoS flow and mapping the SL QoS flow to a DRB.

74. The method of embodiment 73, wherein the DRB comprises an existing DRB or a new DRB.

75. The method of any of embodiments 73-74, further comprising performing a SL QoS flow release operation.

76. The method of any of embodiments 73-75, wherein the release operation comprises:
clearing a QoS flow context and releasing the DRB if no other QoS flows are using the DRB.

77. The method of any of embodiments 73-76,
wherein the QoS flow that is related to a given V2X service is associated with a DRB, and
wherein only other QoS flows that are related to the given V2X service are associated with the DRB.

78. The method of any of embodiments 73-77,
wherein the QoS flow that is related to a given V2X service is multiplexed into a DRB, and
wherein only other QoS flows that are related to the given V2X service are multiplexed into the DRB.

79. The method of any of embodiments 73-78,
wherein the QoS flow that is related to a given casting scheme is associated with a DRB, and
wherein only QoS flows that are associated with the given casting scheme are associated with the DRB.

80. The method of any of embodiments 73-79,
wherein the QoS flow that is related to a given casting scheme is multiplexed into a DRB, and
wherein only QoS flows that are multiplexed into the given casting scheme are associated with the DRB.

81. The method of any of embodiments 73-80,
wherein the QoS flow that is related to a given casting session is associated with a DRB, and
wherein only QoS flows that are associated with the given casting session are associated with the DRB.

82. The method of any of embodiments 73-81,
wherein the QoS flow that is related to a given casting session is multiplexed into a DRB, and
wherein only QoS flows that are multiplexed into the given casting session are associated with the DRB.

82. The method according to any combination of embodiments 73-82.

83. The method of any of embodiments 73-82, wherein a MAC layer multiplexes into the same MAC PDU as DRBs having QoS flows that are associated with a same V2X service.

84. The method of any of embodiments 73-83, wherein a MAC layer multiplexes into the same MAC PDU as DRBs having QoS flows that are associated with a same casting scheme.

85. The method of any of embodiments 73-84, wherein a MAC layer multiplexes into the same MAC PDU as DRBs having QoS flows that are associated with a same casting session.

86. The method according to any combination of embodiments 83-85.

87. A network node adapted to perform according to any of embodiments 37 to 86.

88. A network node comprising:
transceiver;
a processor coupled to the transceiver; and
memory coupled with the processor, wherein the memory stores instructions that when executed by the processor causes the network node to perform operations according to any of Embodiments 73 to 86.

88. A computer program product, comprising:
a non-transitory computer readable storage medium comprising computer readable program code embodied in the medium that when executed by a processor of a network node, causes the network node to perform operations according to any of Embodiments 73 to 86.

Explanations for abbreviations from the above disclosure are provided below.

| Abbreviation | Explanation |
| --- | --- |
| NW | Network |
| UE | User Equipment |
| V2X | Vehicle-to-Everything |
| MAC | Medium Access Control |
| MAC CE | MAC Control Element |
| PUSCH | Physical Uplink Shared Channel |
| PUCCH | Physical Uplink Control Channel |
| PDU | Packet Data Unit |
| 3GPP | Third Generation Partnership Project |
| LCID | Logical Channel Identity |
| MAC | Medium Access Control |
| MAC | CE Medium Access Control - Control Element |
| RRC | Radio Resource Control |
| IP | Internet Protocol |
| PPPP | ProSe Per Packet Priority |
| PPPR | ProSe Per Packet Reliability |
| ProSe | Proximity Services |
| PRB | Physical Resource Block |
| SL | Sidelink |
| UL | Uplink |
| DL | Downlink |
| LCG | Logical Channel Group |
| AMF | Access Management Function |
| SMF | Session Management Function |
| DRB | Data Radio Bearer |
| PDU | Protocol data unit |
| QoS | Quality of service |

REFERENCES

[1] 3GPP TS 22.886, "Study on enhancement of 3GPP support for 5G V2X services (Release 15)", 2017
[2] 3GPP TS 38.300 NR and NG-RAN Overall Description; Stage 2 (Release 15) [3] 3GPP TS 23.501, "System Architecture for the 5G System; Stage 2 (Release 15)", 2017
[4] P75478 WO1 "Network controlled Sidelink QoS enforcement on UE level"
[5] P75881 "SL QoS management in autonomous mode"
[6] P76238 US1 Methods of Sidelink Connection Establishment
[7] P76237 US1 Methods of Sidelink Connection Maintenance Further definitions and embodiments are discussed below:

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 11:
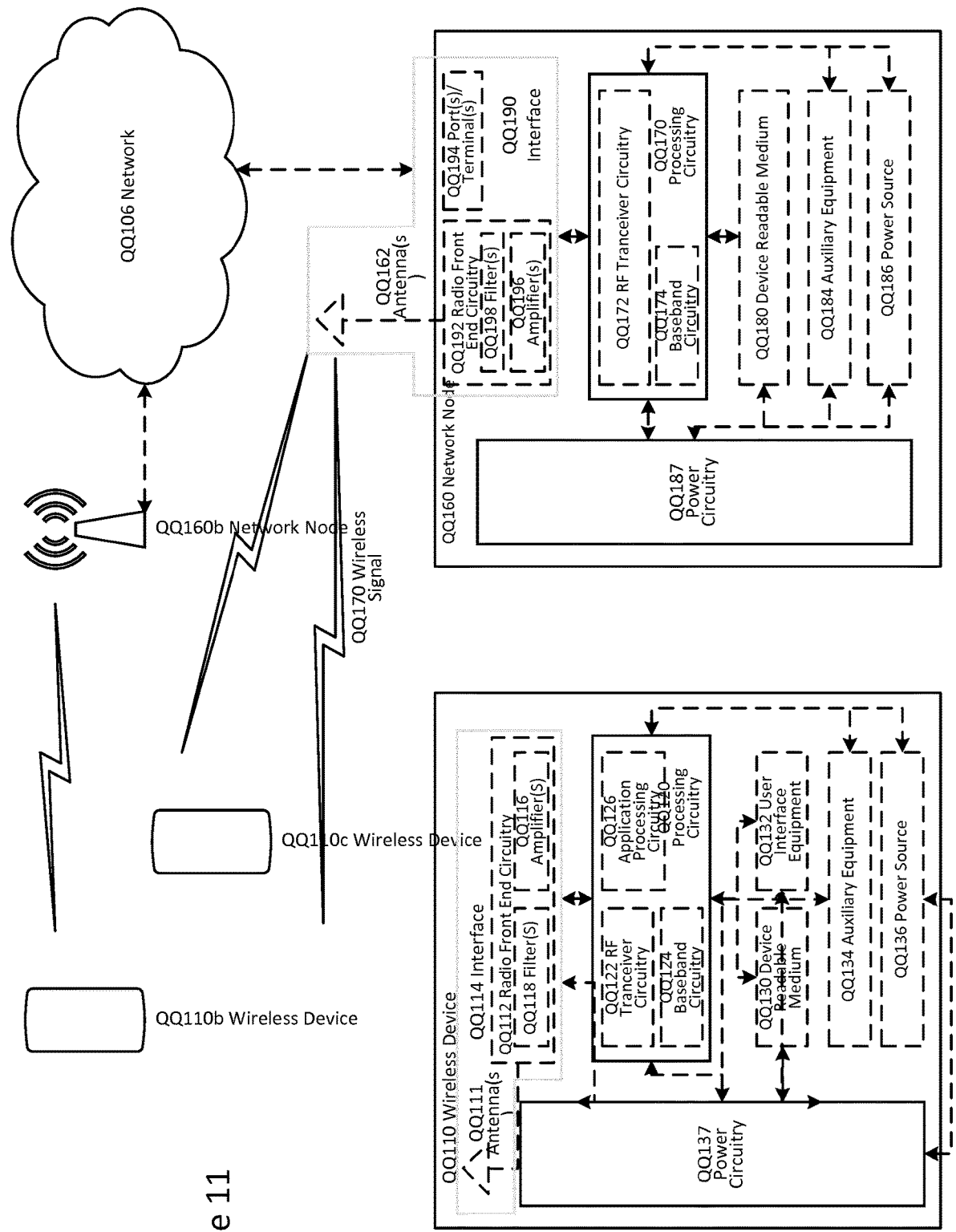
FIG. 11 is a block diagram of a wireless network in accordance with some embodiments.

FIG. 11: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160$b$, and WDs QQ110, QQ110$b$, and QQ110$c$ (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
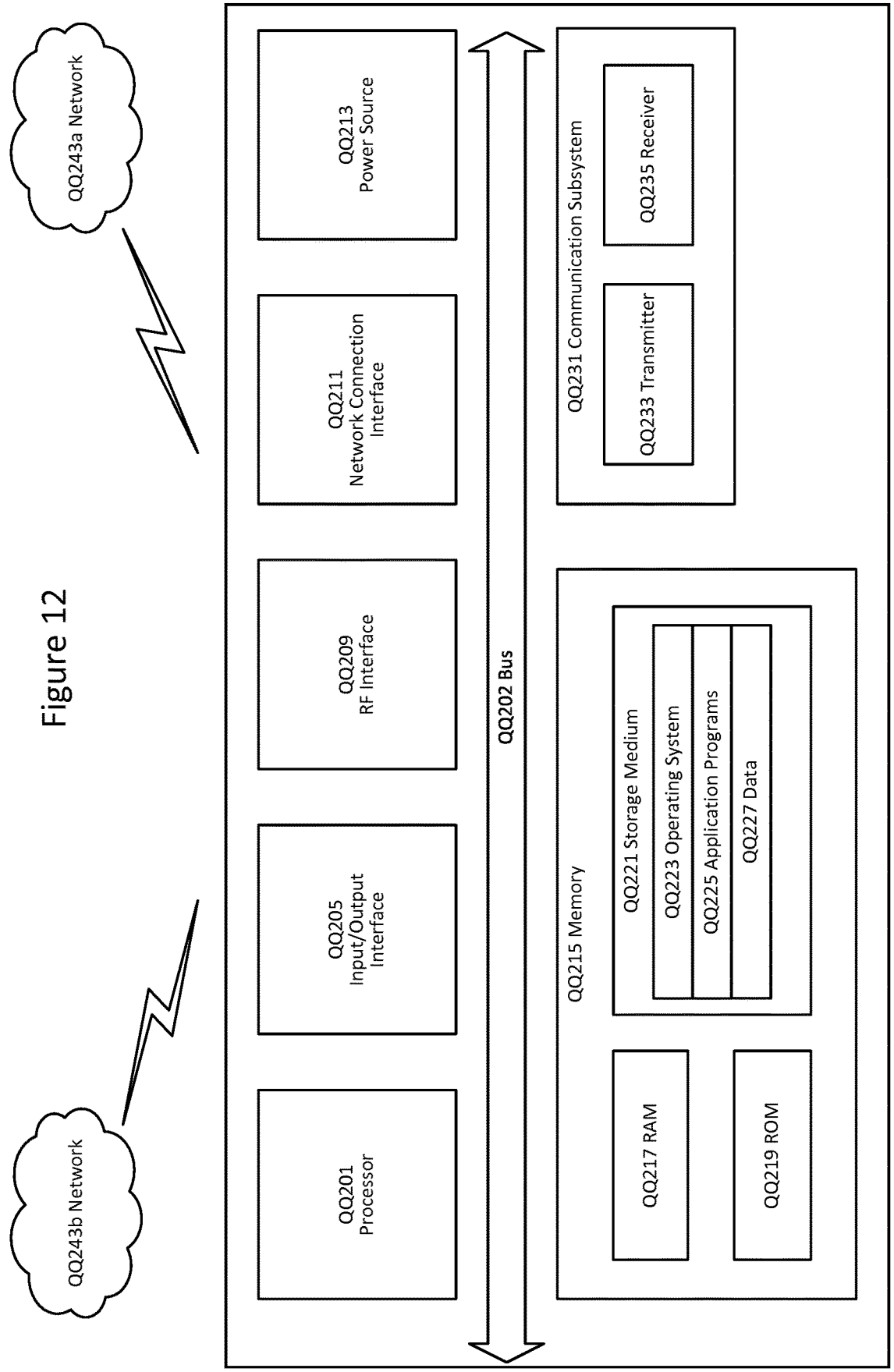
FIG. 12 is a block diagram of a user equipment in accordance with some embodiments.

FIG. 12: User Equipment in accordance with some embodiments

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
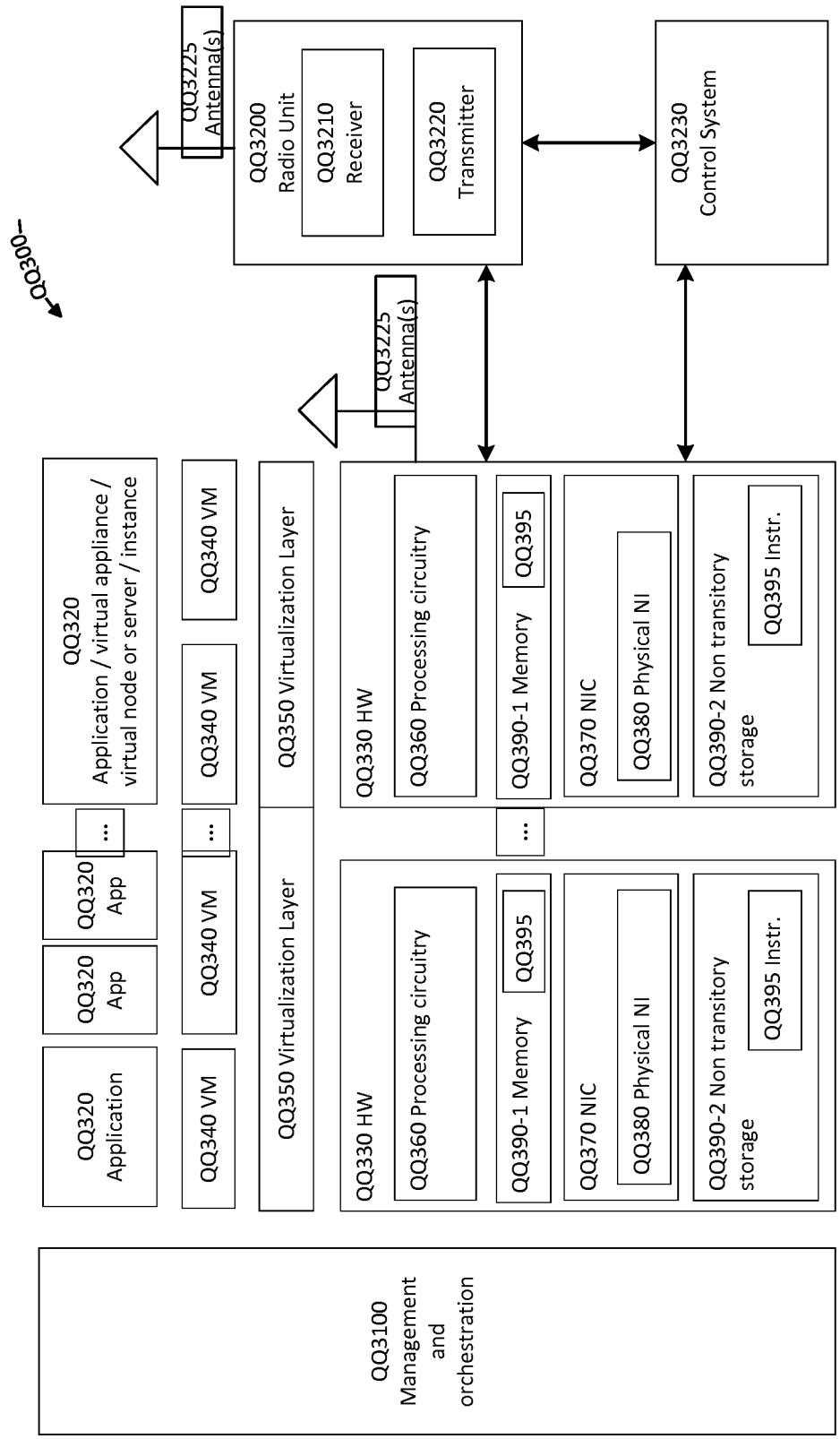
FIG. 13 is a block diagram of a virtualization environment in accordance with some embodiments.

FIG. 13: Virtualization environment in accordance with some embodiments

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
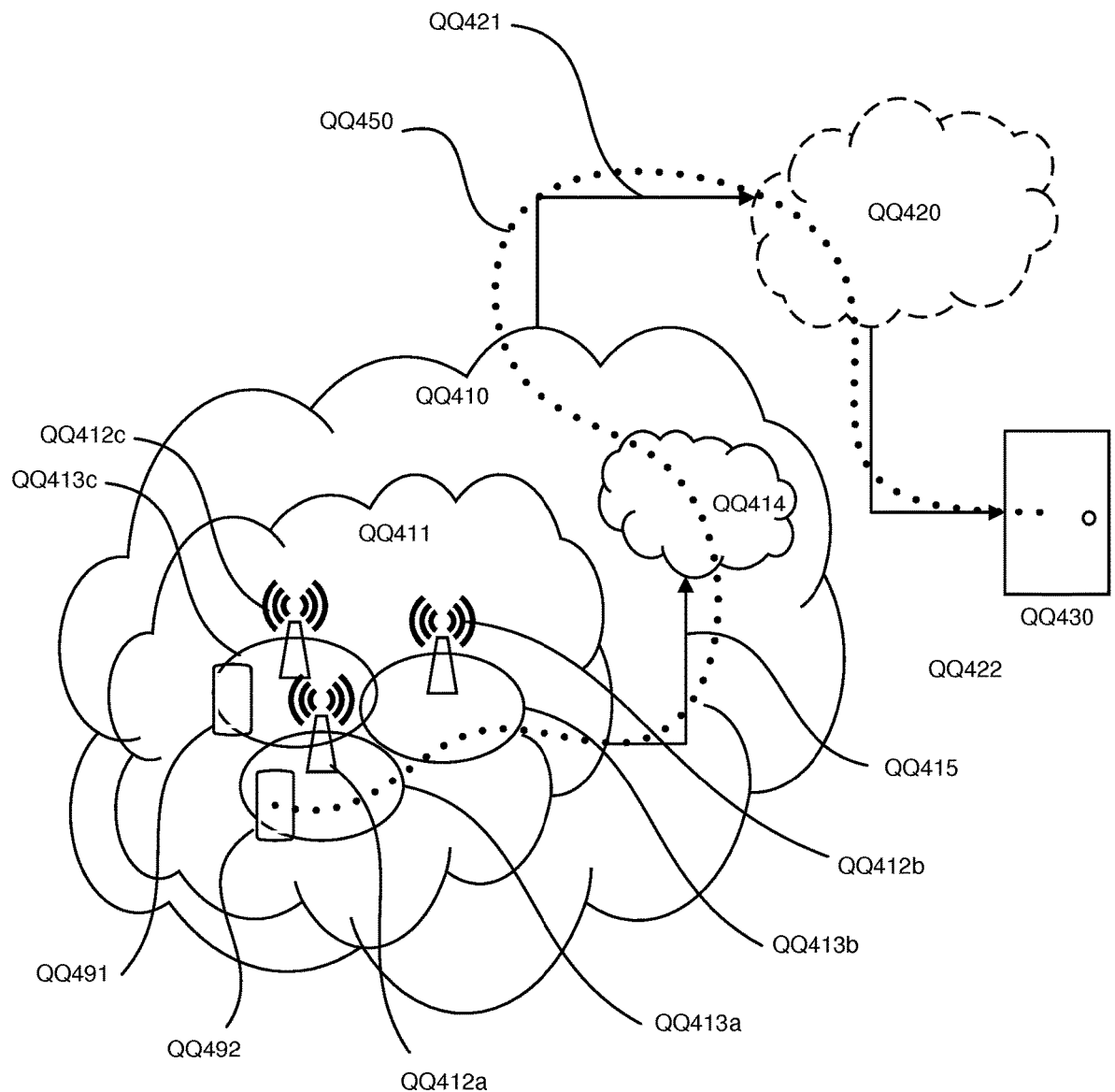
FIG. 14 is a block diagram of a telecommunication network connected via an intermediate network to a host computer in accordance with some embodiments.

FIG. 14: Telecommunication network connected via an intermediate network to a host computer in accordance with some embodiments.

With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
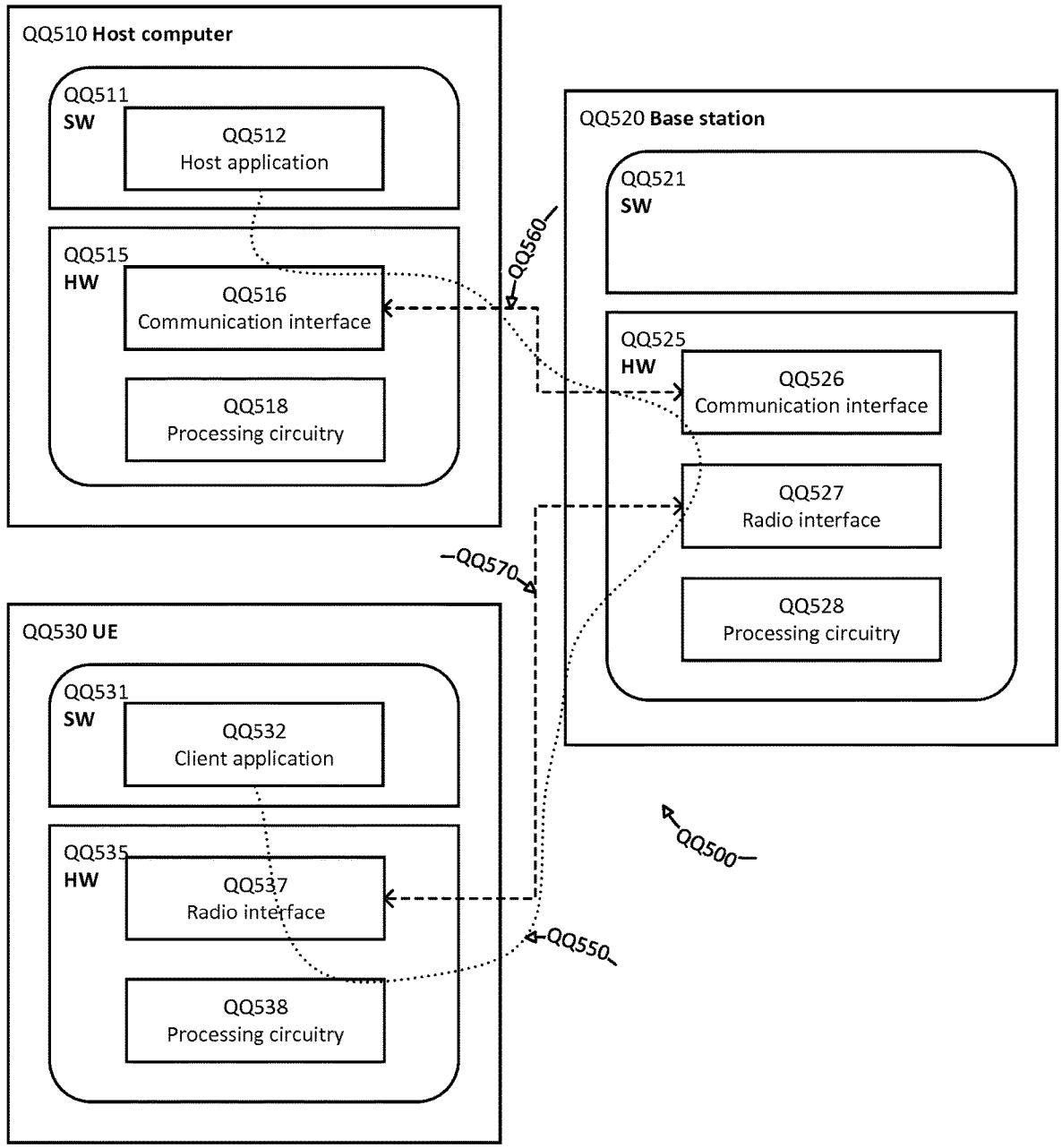
FIG. 15 is a block diagram of a host computer communicating via a base station with a user equipment over a partially wireless connection in accordance with some embodiments.

FIG. 15: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
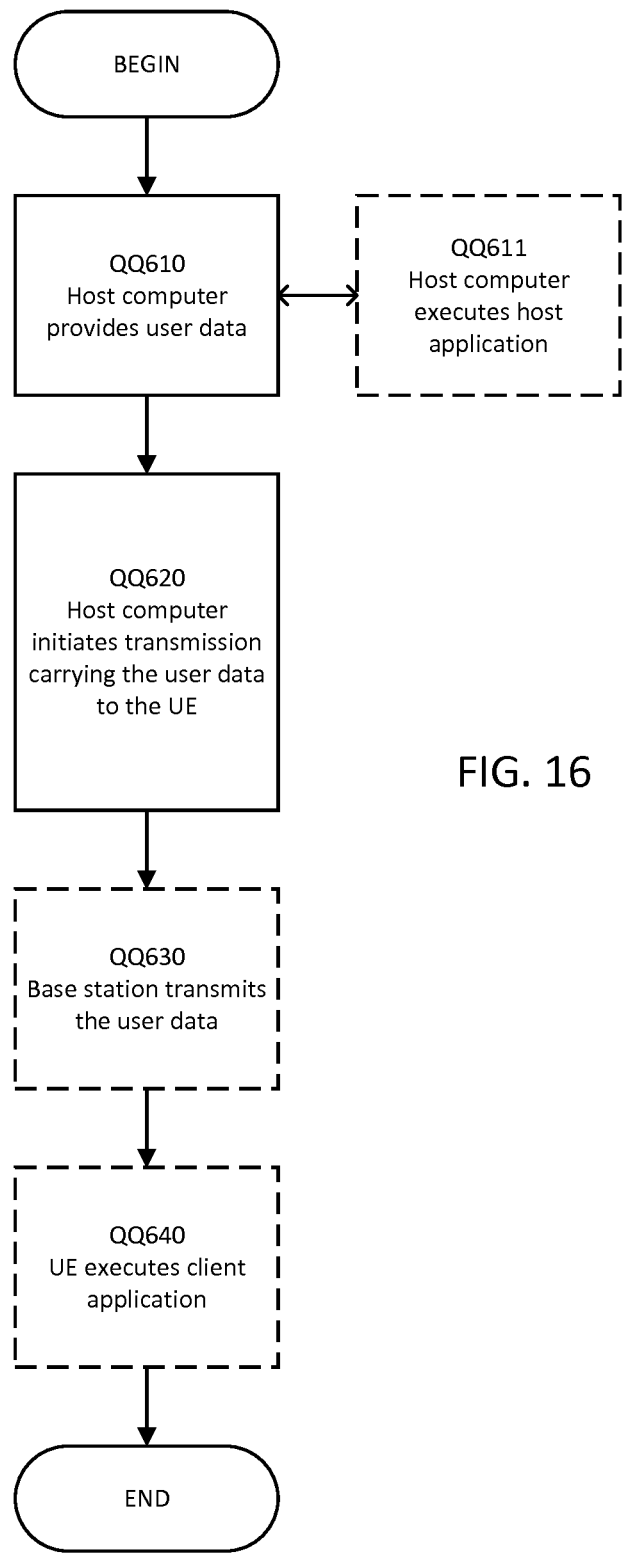
FIG. 16 is a block diagram of methods implemented in a communication system including a host computer, a base station and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
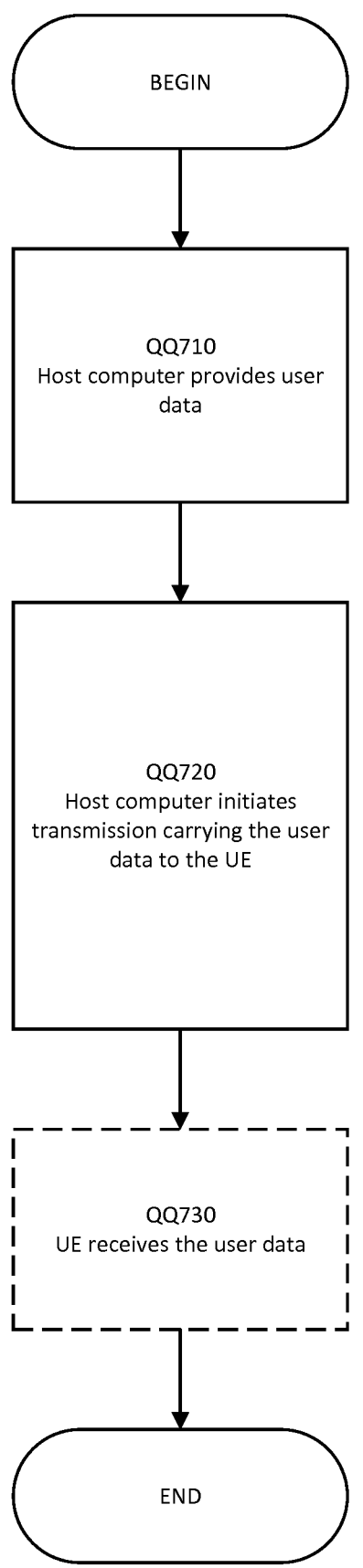
FIG. 17 is a block diagram of methods implemented in a communication system including a host computer, a base station and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
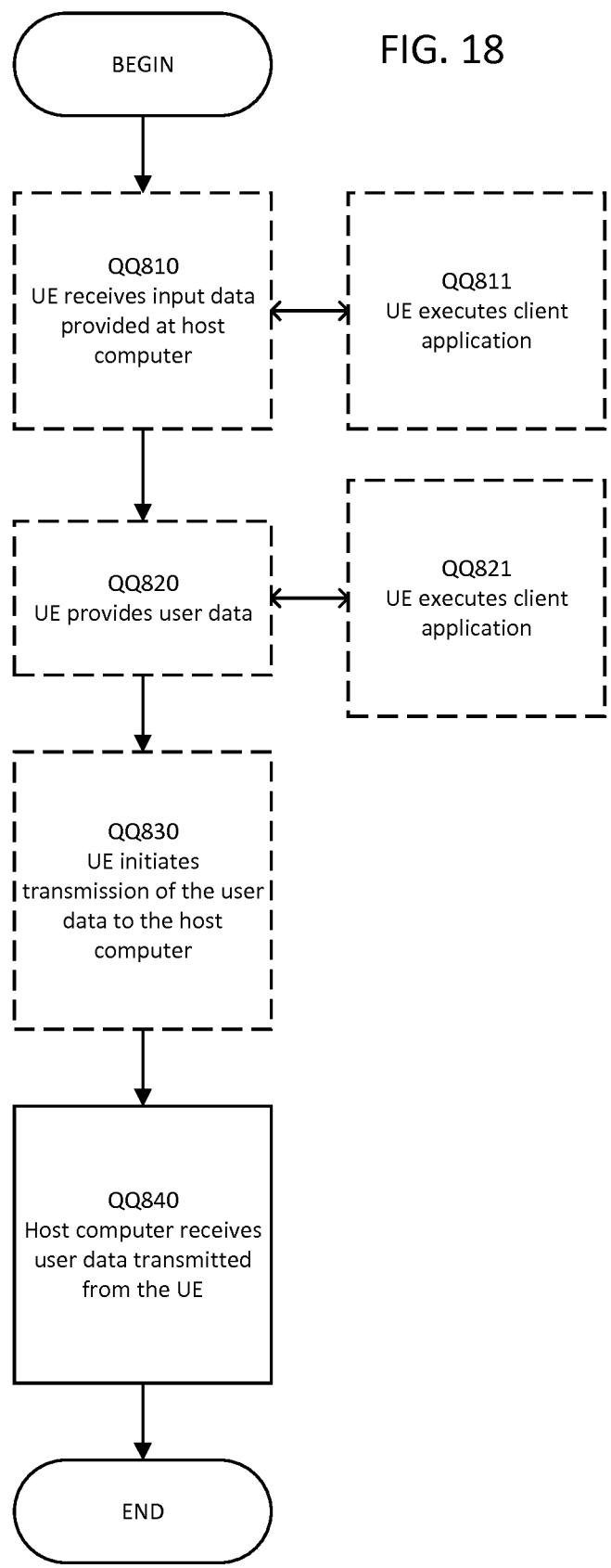
FIG. 18 is a block diagram of methods implemented in a communication system including a host computer, a base station and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
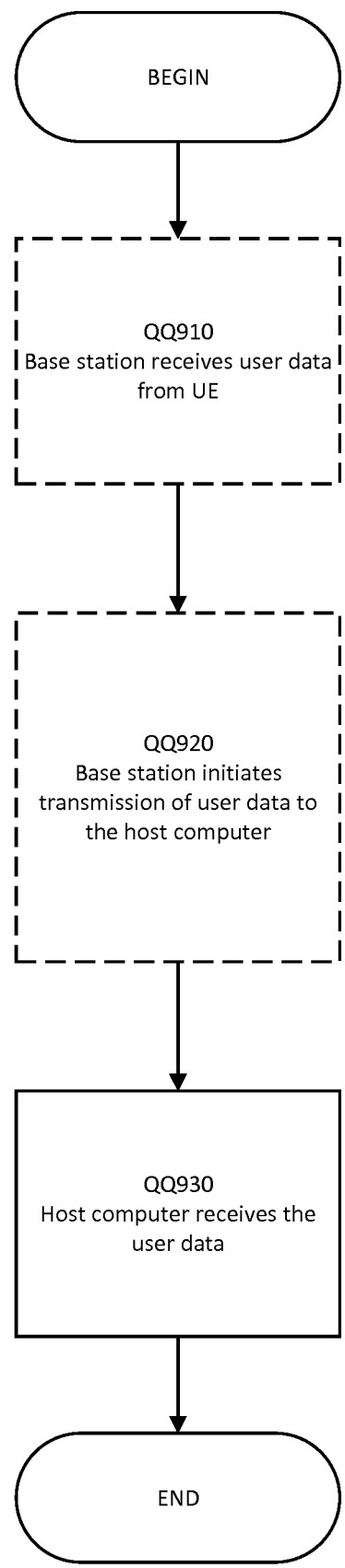
FIG. 19 is a block diagram of methods implemented in a communication system including a host computer, a base station and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to Figures QQ4 and QQ5. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a user equipment, UE, for device-to-device, D2D, communications, the method comprising:
   transmitting a quality of service, QoS, flow establishment request, the flow establishment request indicating that the QoS flow is to be transmitted over a sidelink;
   responsive to a determination that a required QoS flow will be fulfilled, receiving a message indicating that a requested sidelink QoS flow will be supported and receiving mapping and configuration data corresponding to the sidelink QoS flow;
   responsive to determining that the required QoS may not be fulfilled, receiving a message indicating that the requested sidelink QoS flow will not be established;
   receiving, from a gNB, a release request that includes a QoS Flow Identifier, QFI, corresponding to the sidelink QoS flow; and
   clearing a relevant QoS flow context that includes the QFI, QoS profile, QFI to one of DRB mapping and the corresponding DRB, the gNB is caused to release the QoS flow and delete relevant QoS context data.

2. The method of claim 1, further comprising:
   transmitting a QoS flow release request that includes a QFI that identifies a corresponding sidelink QoS flow; and
   clearing a relevant QoS flow context, wherein the relevant QoS flow context comprises QFI, QoS profiles, QFI to one or both of data radio bearer, DRB, mapping and the corresponding DRB.

3. The method of claim 1, wherein
   mapping and configuration data are preconfigured by a core network, CN, and received by the UE, wherein transmitting the QoS flow establishment request comprises transmitting the QoS flow establishment request via radio resource control, RRC, signaling to the gNB, and wherein the QoS flow establishment request comprises QoS flow related data that was preconfigured and indication that the requested QoS flow will be transmitted over the sidelink QoS flow.

4. The method of claim 1, wherein transmitting the QoS flow establishment request comprises transmitting the release request to a core network, CN, via a Non-Access Stratum, NAS, signaling.

5. The method of claim 3, wherein responsive to determining that the required QoS may not be fulfilled, the method further comprising:

receiving a rejection message via RRC and from the gNB signaling that the QoS flow request will be rejected, wherein the RRC rejection message comprises the QFI corresponding to the QoS flow; and updating the UE upper layer that the requested sidelink QoS flow id rejected.

6. The method of claim 1, wherein the UE comprises a transmitter, TX, UE, wherein responsive to establishing the sidelink QoS flow, the method further comprises transmitting, to a receiver, RX, UE a message corresponding to the sidelink QoS flow, wherein the message comprises the QFI value during data transmission and that causes the RX UE to determine one or both of a QoS characteristic and a service type.

7. The method of claim 6, wherein the TX UE is further configured to initiate a sidelink QoS flow release based on a QoS degradation.

8. The method of claim 1, wherein a Medium Access Control, MAC, layer multiplexes into same MAC Packet Data Unit, PDU, as DRBs having QoS flows that are associated with a same casting scheme.

9. The method of claim 1, wherein a Medium Access Control, MAC, layer multiplexes into same MAC Packet Data Unit, PDU, as DRBs having QoS flows that are associated with a same casting session.

10. A user equipment, UE, comprising:
a transceiver;
a processor coupled to the transceiver; and
a memory coupled to the processor, wherein the memory stores instructions that when executed by the processor cause the UE to:
transmit a quality of service, QoS, flow establishment request, the flow establishment request indicating that the QoS flow is to be transmitted over a sidelink;
responsive to a determination that a required QoS flow will be fulfilled, receive a message indicating that a requested sidelink QoS flow will be supported and receive mapping and configuration data corresponding to the sidelink QoS flow;
responsive to determining that the required QoS may not be fulfilled, receive a message indicating that the requested sidelink QoS flow will not be established;
receiving a QoS flow release request that includes a QoS flow identifier, QFI, that identifies a session corresponding to the sidelink QoS flow; and
clearing a relevant QoS flow context, the relevant QoS flow context comprises QFI, QoS profiles, QFI to data radio bearer, one of DRB, mapping, and the corresponding DRB.

11. A method of operating a network node for providing network assisted sidelink quality of service flow management, method comprising:

receiving, from a user equipment, UE, a quality of service, QoS, flow establishment request, the flow establishment request indicating that the QoS flow is to be transmitted over a sidelink;

determining whether a required QoS flow will be fulfilled;

in response to determining that the required QoS flow will be fulfilled, transmitting a message indicating that a requested sidelink QoS will be supported and transmitting mapping and configuration data corresponding to the sidelink QoS flow;

in response to determining that the required QoS flow may not be fulfilled, transmitting a message indicating that the requested sidelink QoS will not be established;

transmitting, to the UE, a release request that includes a QoS flow identifier, QFI, corresponding to the sidelink QoS flow;

clearing a relevant QoS flow context that includes the QFI, QoS profile, QFI to one of DRB mapping and the corresponding DRB; and releasing the QoS flow and delete relevant QoS context data.

12. The method of claim 11, further comprising:
receiving a QoS flow release request that includes the QFI that identifies a session corresponding to the sidelink QoS flow; and clearing a relevant QoS flow context, wherein the relevant QoS flow context comprises QFI, QoS profiles, QFI to data radio bearer, one or both of DRB, mapping, and the corresponding DRB.

13. The method of claim 11, wherein the mapping and configuration data arc preconfigured by a core network and transmitted to the UE, wherein receiving the QoS flow establishment request comprises receiving the QoS establishment request directly from the UE via radio resource control, RRC, signaling to a gNB, and wherein the QoS establishment request comprises QoS flow related data that was preconfigured and indication that the requested QoS flow will be transmitted over the sidelink QoS flow.

14. The method of claim 13, wherein responsive to determining that the required QoS may not be fulfilled, the method further comprising:

transmitting a rejection message via RRC to the UE signaling that the QoS flow request will be rejected, wherein the RRC rejection message comprises the QFI corresponding to the QoS flow; and causing the UE to update the UE upper layer that the requested sidelink QoS flow is rejected.

15. The method of claim 11, wherein receiving the QoS flow establishment request comprises transmitting the release request to a core network, CN, via a Non-Access Stratum, NAS, signaling.

16. The method of claim 11, wherein a Medium Access Control, MAC, layer multiplexes into same MAC Protocol Data Unit, PDU, as DRBs having QoS flows that are associated with a same casting scheme.

17. The method of claim 11, wherein a Medium Access Control, MAC, layer multiplexes into same MAC Protocol Data Unit, PDU, as DRBs having QoS flows that are associated with a same casting session.

18. A network node comprising:
a transceiver;
a processor coupled to the transceiver; and
a memory coupled with the processor, wherein the memory stores instructions that when executed by the processor causes the network node to:

receive, from a user equipment, UE, a quality of service, QoS, flow establishment request, the flow establishment request indicating that the QoS flow is to be transmitted over a sidelink;

determine whether a required QoS flow will be fulfilled;

in response to determining that the required QoS flow will be fulfilled, transmit a message indicating that a requested sidelink QoS will be supported and transmitting mapping and configuration data corresponding to the sidelink QoS flow;

in response to determining that the required QoS flow may not be fulfilled, transmit a message indicating that the requested sidelink QoS will not be established;

transmit, to the UE, a release request that includes a QFI corresponding to the sidelink QoS flow;

clear a relevant QoS flow context that includes the QFI, QoS profile, QFI to one of DRB mapping and the corresponding DRB; and release the QoS flow and delete relevant QoS context data.

* * * * *